US007915361B2

(12) United States Patent
Morikawa et al.

(10) Patent No.: US 7,915,361 B2
(45) Date of Patent: Mar. 29, 2011

(54) FLUOROCOPOLYMER, PROCESS FOR PRODUCING FLUOROCOPOLYMER, FLUOROCOPOLYMER CURABLE COMPOSITION, AND CURED OBJECT

(75) Inventors: Tatsuya Morikawa, Settsu (JP); Kazuhiro Yamamura, Settsu (JP); Manabu Fujisawa, Settsu (JP); Etsuo Minamino, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 753 days.

(21) Appl. No.: 11/889,645

(22) Filed: Aug. 15, 2007

(65) Prior Publication Data
US 2007/0293644 A1 Dec. 20, 2007

Related U.S. Application Data

(62) Division of application No. 10/507,591, filed as application No. PCT/JP03/003055 on Mar. 14, 2003, now Pat. No. 7,538,170.

(30) Foreign Application Priority Data

Mar. 14, 2002 (JP) ................................. 2002-070850
Dec. 5, 2002 (JP) ................................. 2002-354432

(51) Int. Cl.
*C08F 16/24* (2006.01)
(52) U.S. Cl. ....................... 526/247; 526/250
(58) Field of Classification Search .................. 526/247, 526/250
See application file for complete search history.

(56) References Cited

U.S. PATENT DOCUMENTS

| 3,147,314 A | | 9/1964 | Cluff |
|---|---|---|---|
| 3,291,761 A | * | 12/1966 | Griffin ............................. 521/46 |
| 4,057,566 A | * | 11/1977 | Carter et al. ................... 556/434 |
| 4,100,136 A | * | 7/1978 | Carter et al. ................... 525/478 |
| 4,361,678 A | * | 11/1982 | Tatemoto et al. ............. 528/374 |
| 4,503,206 A | | 3/1985 | Robinson |
| 4,654,444 A | * | 3/1987 | Oka et al. ...................... 568/560 |
| 5,001,278 A | | 3/1991 | Oka et al. |
| 5,554,689 A | * | 9/1996 | Langstein et al. ............ 525/102 |
| 6,174,928 B1 | * | 1/2001 | Mizuide et al. ................. 521/46 |
| 7,521,509 B2 | * | 4/2009 | Morikawa et al. ............ 525/102 |

FOREIGN PATENT DOCUMENTS

| CN | 1092438 A | | 9/1994 |
|---|---|---|---|
| EP | 527008 A1 | * | 2/1993 |
| EP | 0 606 883 A1 | | 7/1994 |

(Continued)

OTHER PUBLICATIONS

Database WPI Week 200157, Thomson Scientific, London, GB; AN 2001-516871; XP002530079 & JP 2001 081131 A; Nippon Mektron KK; Mar. 27, 2001.

(Continued)

*Primary Examiner* — Peter D. Mulcahy
*Assistant Examiner* — Henry Hu
(74) *Attorney, Agent, or Firm* — Sughrue Mion, PLLC

(57) ABSTRACT

The present invention has for its object to provide a fluorocopolymer which is available at low cost, has fluidity at room temperature, and is curable, a method of producing the same copolymer and a curable composition having good processability and in situ moldability. The present invention is directed to a fluorocopolymer which is fluid at room temperature and curable, and which is obtainable from a trifluorovinyl group-containing monomer with an ethylenically unsaturated double bond moiety being a trifluorovinyl group.

4 Claims, 5 Drawing Sheets

FOREIGN PATENT DOCUMENTS

| | | |
|---|---|---|
| EP | 0 872 495 | 10/1998 |
| EP | 0 947 534 A1 | 10/1999 |
| EP | 1489113 A1 * | 3/2003 |
| EP | 1 489 113 A1 | 12/2004 |
| JP | 53-26284 | 3/1978 |
| JP | 56-57811 | 5/1981 |
| JP | 63-44744 | 9/1988 |
| JP | 06-100771 * | 4/1994 |
| JP | 6-100771 | 4/1994 |
| JP | 6-100771 A | 4/1994 |
| JP | 8-67660 | 3/1996 |
| JP | 9-316276 A | 12/1997 |
| JP | 10-279635 | 10/1998 |
| JP | 11-92529 | 4/1999 |
| JP | 11-286541 | 10/1999 |
| JP | 11-322842 | 11/1999 |
| JP | 2001-81131 | 3/2001 |
| JP | 2002-20615 A | 1/2002 |
| JP | 2002-37965 A | 2/2002 |
| JP | 2002-97230 | 4/2002 |
| WO | WO 00/29479 | 5/2000 |
| WO | WO 03/076484 A1 | 9/2003 |

OTHER PUBLICATIONS

Database WPI Week 199419; Thomson Scientific, London, GB; AN 1994-156797; XP002530080 & JP 06 100771 A; Asahi Glass Co Ltd; Apr. 12, 1994.

* cited by examiner

FLUOROCOPOLYMER, PROCESS FOR PRODUCING FLUOROCOPOLYMER, FLUOROCOPOLYMER CURABLE COMPOSITION, AND CURED OBJECT

CROSS-REFERENCE TO RELATED APPLICATION

This application is a divisional of U.S. application Ser. No. 10/507,591 now U.S. Pat. No. 7,538,170 filed Apr. 29, 2005 which is a 371 of PCT International Application No. PCT/JP03/003055 filed Mar. 14, 2003, the above-noted applications incorporated herein by reference in their entirety.

TECHNICAL FIELD

The present invention relates to curable fluorocopolymers having fluidity at room temperature, and more particularly to low-molecular-weight fluorocopolymers having cure sites at both ends of a trunk chain. The present invention further relates to a process for producing said copolymer, a curable composition comprising said copolymer, and a cured article.

BACKGROUND TECHNOLOGY

Fluororubbers exhibit excellent chemical resistance, solvent resistance and heat resistance, among other properties, and, as such, find application in a broad range of uses, for example as sealants which are fully serviceable under rugged conditions.

Fluororubbers usually comprise polymers having pre-cure average molecular weights within the range of about 50,000 to 200,000 and compositions comprising such polymers together with a crosslinking agent and other formulating agents are so high in viscosity that the manufacture of shaped articles requires fluidizing the compositions at elevated temperatures in the molding-curing stage.

However, with such high-viscosity compositions, it is difficult to obtain shaped articles having complicated geometries. A further disadvantage is that because of the impossibility of field molding, e.g. in situ curing at rubber installation sites in an automotive assembly line, a premolding procedure is essential so that the process cannot be simplified and the mode of utilization is limited.

To overcome these disadvantages, a demand exists for the development of a liquid rubber which shows pre-cure fluidity at room temperature. Such liquid rubber enables on-site molding and, moreover, can be poured into molds in a liquid state at room temperature so that shaped articles of complicated geometry can be easily obtained.

As such liquid rubbers, silicone rubbers as heat-resistant rubbers of the on-site application type are commercially available. However, from oil and solvent resistance points of view, the advent of fluorine-containing liquid elastomers has been awaited in earnest. Silicone rubbers present with many problems arising from the liberation of siloxanes in uses requiring cleanliness but the release of siloxane gases cannot be prevented because of the degradation inherent in the molecular structure. Even if the rubbers are purified in the production stage, the reduction in the amount of liberation of siloxanes is limited.

Fluororubbers comprising polymers having high molecular weights may have sufficient elastomeric properties prior to crosslinking because the crosslink interval of the trunk chain can be increased and, even after curing, the trunk chain between the crosslinks has flexibility. In contrast, liquid fluororubbers comprises polymers having low molecular weights providing for fluidity at room temperature prior to crosslinking and usually have short crosslink intervals, with the consequence that the post-cure elastomeric properties are inadequate.

When the fluororubber comprising a polymer having a high molecular weight prior to crosslinking does not have crosslinking sites at both ends of a trunk chain but has such sites in intermediate positions, the trunk chain segment from the crosslinking site to the chain end is not directly involved in the formation of a three-dimensional network but has a certain degree of freedom. However, since it is inherently a high polymer, the presence of this trunk chain segment has no material influence on the cured article.

In contrast, when the crosslinking site of a liquid fluororubber is not situated at the trunk chain end but in an intermediate location, the trunk chain segment from the crosslinking site to the chain end acts as if it were a plasticizer because of the low molecular weight of the liquid rubber, with the result that the mechanical strength of the cured article is decreased.

In order to overcome these disadvantages and carry out the curing reaction with good efficiency and improve the moldability of liquid rubber, it is desirable to ensure that the trunk chain of the polymer constituting the liquid rubber has cure sites substantially at both ends of a trunk chain. As regards the technology for introducing a functional group serving as said cure site into the trunk chain end, several methods have been proposed as follows.

Japanese Kokoku Publication Sho-63-44744 discloses a method which comprises introducing a t-butoxy group into the trunk chain end of a vinylidene fluoride [VdF]-hexafluoropropylene [HFP] copolymer by means of a certain fluorine-containing diacyl peroxide and converting the same group to a hydroxyl group with an acid. However, this polymerization initiator is a special and expensive reagent and, moreover, must be used in a large amount for production of a low-molecular-weight polymer, thus being disadvantageous cost-wise.

As an analogous technology, the method comprising using a fluorine based peroxide is disclosed in U.S. Pat. No. 3,291,761 but this method is also costly.

As a technology for producing a fluororubber having a cure site at both ends of a trunk chain, Japanese Kokai Publication Hei-08-67660 and Japanese Kokai Publication Hei-11-286541 disclose processes involving the use of a perfluorodicarboxylic acid fluoride as a polymerization initiator. However, this technology is also disadvantageous cost-wise because of the high price of the polymerization initiator.

Japanese Kokai Publication Sho-56-57811 discloses a method of introducing an iodine atom into the trunk chain end of a liquid fluorocopolymer comprising a VdF copolymer which comprises using an iodine compound as a chain transfer agent. This technology is seriously handicapped in production cost, for it requires a large amount of the expensive iodine compound and, moreover, because the highly reactive iodine is contained in a proportion of several mass %, the transformation to a different functional group by a polymer reaction is required.

Japanese Kokai Publication Hei-11-322842 discloses a method for producing a fluorinated oligomer having a carboxyl group at both ends of a trunk chain which comprises causing a crosslinked fluororubber to swell with an organic solvent and decomposing it in the presence of a base and a peroxide. However, there is the problem that while this decomposition is feasible for a crosslinked article comprising VdF polymer, it cannot be applied to perhalogenated elastomers.

As a technology for introducing a hydroxyl group into the trunk chain end, Progress in Polymer Science, 26, 2001, p. 105-187 describes a method which comprises preparing a VdF/HFP copolymer having an average molecular weight of about 4000 in the presence of hydrogen peroxide and causing $LiAlH_4$ to act upon the copolymer. However, as the hydroxyl radical reacts with the $CF_2$ side of $CF_2=CH_2$ in the above copolymerization, the unstability of the hydroxyl group causes the reaction to proceed further so that actually the hydroxyl radical is hardly introduced into the chain end.

Generally the technology for introducing a functional group into the trunk chain end of a polymer makes it necessary to adopt such special techniques as above and is, therefore, costly and limited in the scope of application, so that it is deficient in practical utility.

The pamphlet of WO 00/29479 discloses a fluorine-containing elastomer having a carboxyl group at the trunk chain end. This elastomer is, for instance, a substance having a large molecular weight as can be seen if only from the infrared absorption spectrum in FIG. 1 of the pamphlet which indicates a relatively low carboxyl group concentration compared with the carbon-fluorine bond concentration and, furthermore, it is an elastomer, that is to say a high polymer having rubbery elasticity at room temperature, and, therefore, has no fluidity at room temperature.

SUMMARY OF THE PRESENT INVENTION

In the light of the above state of the art, the present invention has for its object to provide a fluorocopolymer which is available at low cost, has fluidity at room temperature, and is curable, a method of producing the same copolymer and a curable composition having good processability and in situ moldability.

The present invention is directed to a fluorocopolymer which is fluid at room temperature and curable, and which is obtainable from a trifluorovinyl group-containing monomer with an ethylenically unsaturated double bond moiety being a trifluorovinyl group.

The present invention is further directed to a method of producing a fluorocopolymer comprising subjecting trifluorovinyl group-containing monomers to radical polymerization by using a polymerization initiator to give said fluorocopolymer, wherein said polymerization initiator has a function to impart curability to said fluorocopolymer and, as said trifluorovinyl group-containing monomer, two or more different species thereof are used.

The present invention is further directed to a fluorocopolymer curable composition (A) comprising a fluorocopolymer and a crosslinking agent wherein said crosslinking agent accounts for 0.1 to 10 parts by mass (as solids) relative to 100 parts by mass as solids of said fluorocopolymer.

The present invention is further directed to a cured article obtained from a fluorocopolymer curable composition (B) comprising a fluorocopolymer wherein said fluorocopolymer is obtainable from tetrafluoroethylene and a perfluoro(alkylvinylether) represented by the following general formula (II)

(wherein $R_f^1$ represents a perfluoroalkyl group of 1 to 20 carbon atoms optionally having 4 or less of oxygen atoms) and said cured article has a ratio (a/b) of its mass (a) after immersion in a perfluoro(2-n-butyltetrahydrofuran) solvent to its mass (b) before said immersion being not less than 0.95.

BRIEF DESCRIPTION OF THE ACCOMPANYING DRAWINGS

DETAILED DESCRIPTION OF THE PRESENT INVENTION

Figure 1:
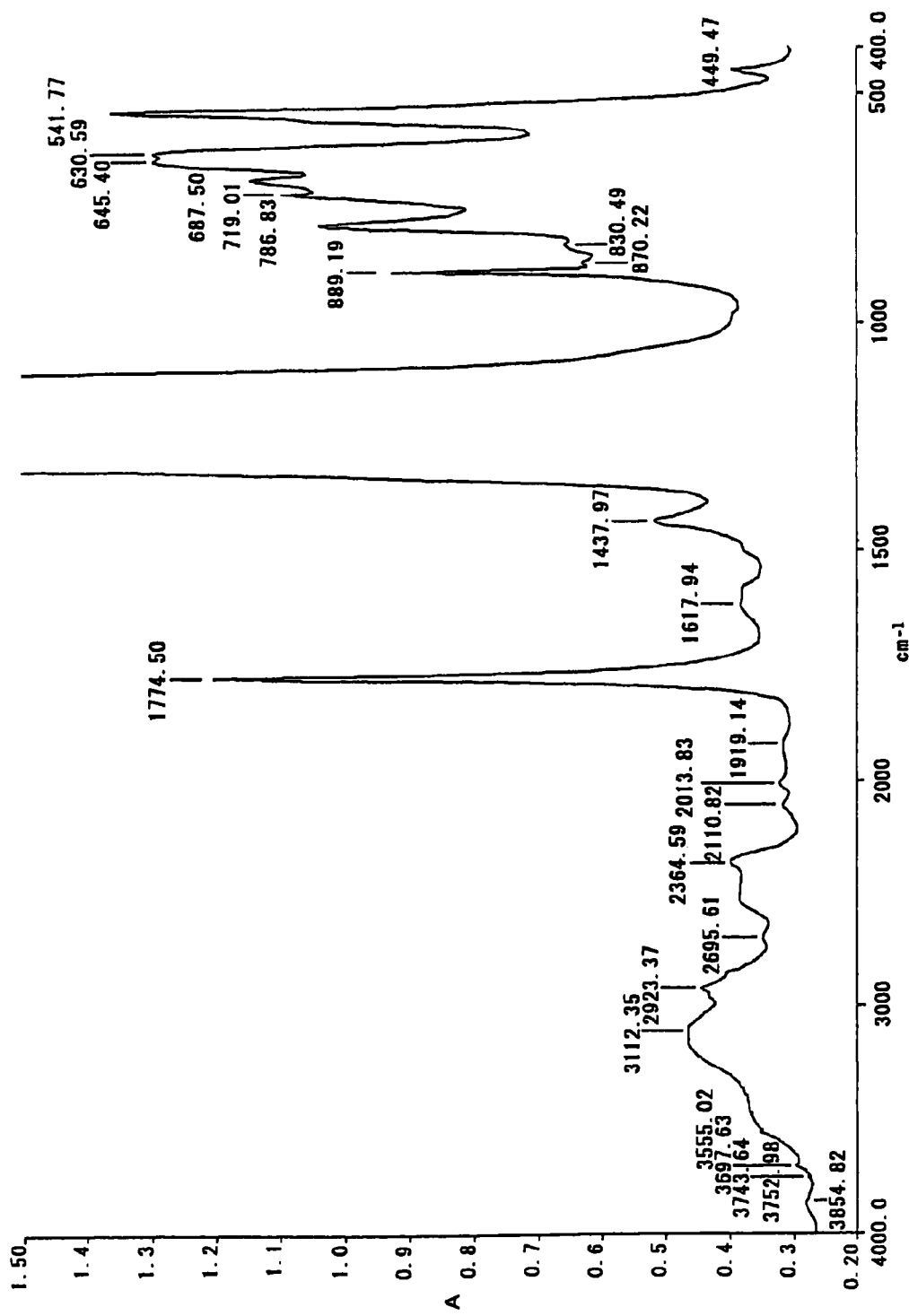
FIG. 1 is an infrared absorption spectrum obtained by the infrared spectrometric analysis in Example 1.

The present invention is now described in detail.

The fluorocopolymer of the present invention is obtainable from a trifluorovinyl group-containing monomer.

In this specification, the above term "trifluorovinyl group-containing monomer" is intended to mean a monomer whose ethylenically unsaturated double bond moiety is a trifluorovinyl group $[CF_2=CF—]$.

In this specification, the above term "ethylenically unsaturated double bond moiety" is intended to mean the molecular structure of said trifluorovinyl group-containing monomer which consists of two carbon atoms forming a carbon-carbon double bond and the atoms or atomic groups attached to said carbon atoms. The carbon-carbon double bond mentioned above is usually singular per molecule of said trifluorovinyl group-containing monomer.

The fluorocopolymer of the present invention is obtained as, in said radical polymerization, the radical generated from a polymerization initiator adds itself to any of the two carbon atoms forming said ethylenically unsaturated double bond moiety of the trifluorovinyl group-containing monomer and the radical compound resulting from this addition reaction reacts with another molecule of said trifluorovinyl group-containing monomer in a serial fashion. The above-mentioned radical, in the case where a peroxide compound is used as the polymerization initiator, is the radical derived from the peroxide compound.

Referring, further, to the radical derived from a peroxide compound in the present invention, assuming that a persulfate, which is frequently used in the art, is used as said peroxide compound, the hydroxyl radical [.OH], for one, is preferred. In this case, the amount of the hydroxyl radical to be generated can be easily modulated by varying the reaction conditions such as the pH of the medium for radical polymerization.

Since, in the present invention, said ethylenically unsaturated double bond moiety is a trifluorovinyl group, a carboxyl group is invariably generated regardless of whether it is the α-carbon or β-carbon, of said two carbon atoms, to which the radical derived from the peroxide compound adds itself. By way of illustration, when said hydroxyl radical adds itself to the α-carbon to make the trunk chain end —$CFR^2$—$CF_2OH$ (where $R^2$ is the same as in the general formula (III) which appears hereinafter), the end group —$CF_2OH$ is so unstable that it is converted to —CF(=O) and further to —C(=O)OH.

In the case of the fluorocopolymer of the present invention, the radical polymerization stops as carboxyl-terminated grown radicals starting with hydroxyl radicals are coupled to each other and, therefore, the product copolymer has a carboxyl group at both ends. The carboxyl group is easily generated on hydrolysis of said —$CF_2OH$ but since the fluorocopolymer of the present invention is usually produced by the radical polymerization in an emulsion polymerization system, the above-mentioned hydrolysis can be easily induced. As the carboxyl group is so highly reactive that a high curability can be expected and, moreover, it can be converted to a functional group or bond other than carboxyl, for example a cyano group, a hydroxyl group, or an ester bond, thus broadening the freedom of choice of the crosslinking system.

In cases where the fluorocopolymer of the present invention has said carboxyl group, which is obtainable by addition of the radical derived from the polymerization initiator, and/or the cyano group, hydroxyl group, or ester bond which can be derivatized from said carboxyl group as the cure site, the introduction of the cure site can be carried out at reduced cost without the need for an expensive, special polymerization initiator or the like additive.

Incidentally, assuming that a monomer other than said trifluorovinyl group-containing monomer, for example vinylidene fluoride [VdF], is chiefly used, a carboxyl group is formed as mentioned above when the hydroxyl radical adds itself to the carbon atom attached to a fluorine atom, of the two carbon atoms forming a carbon-carbon double bond at the growing end, but when the hydroxyl radical adds itself to the carbon atom to which a hydrogen atom is attached, a methylol group [—CH$_2$OH] is formed and this methylol group is not converted to a carboxyl group under the usual radical polymerization conditions. Therefore, the functional group at the trunk chain end varies in kind so that it is not easy to select a crosslinking agent to be used and the cured article tends to become non-homogeneous.

The above-mentioned trifluorovinyl group-containing monomer is more ready to undergo addition because of low steric hindrance as compared with the case in which a group or atom which is neither a fluorine atom nor a hydrogen atom is attached to each of the two carbon atoms constituting a carbon-carbon double bond and is more satisfactory in polymerizability because of the low chances for chain transfer as compared with the case in which a hydrogen atom is attached to the carbon atom constituting a carbon-carbon double bond.

The trifluorovinyl group-containing monomer mentioned above may be used one species alone or in a combination of two or more species.

The trifluorovinyl group-containing monomer is not particularly restricted provided that its ethylenically unsaturated double bond moiety is a trifluorovinyl group but is preferably a trifluorovinyl group-containing linear compound of the following general formula (III).

$$CF_2=CF-R^2-Y^1 \quad (III)$$

(wherein Y$^1$ represents a halogen atom or a hydrogen atom; R$^2$ represents an alkylene group of 0 to 20 carbon atoms optionally having 10 or less of oxygen atoms and being optionally substituted by fluorine; provided, however, that when the number of carbon atoms of said alkylene group R$^2$ is equal to 0, Y$^1$ is a halogen atom).

The oxygen atoms mentioned above in connection with R$^2$ are preferably those forming ether bonds from the standpoint of flexibility of the product fluorocopolymer.

If the number of oxygen atoms in R$^2$ exceeds 10, the cured article tends to deteriorate in mechanical properties. The preferred upper limit is 6 and the still more preferred limit is 5. For improved polymerizability, it is preferable that at least a portion of the trifluorovinyl group-containing monomer should have at least one such oxygen atom.

For improved copolymerizability, the trifluorovinyl group-containing linear compound represented by the above general formula (III) is preferably a fluorovinylether of the following general formula (I).

$$CF_2=CF-O-R^1 \quad (I)$$

(wherein R$^1$ represents an alkyl group of 1 to 20 carbon atoms optionally having 4 or less of oxygen atoms and be optionally substituted by a fluorine atom). The oxygen atom or atoms in R$^1$ above are preferably those forming ether bonds.

The above fluorovinylether is preferably a compound of the above general formula (I) in which R$^1$ is an alkyl group not having an oxygen atom but being optionally substituted by fluorine. In view of the ease of emulsification in water and superior emulsion-polymerizability, R$^1$ is preferably such that both the number of carbon atoms and the number of oxygen atoms are small. The upper limit of the number of carbon atoms of said alkyl group is preferably 8, more preferably 3. The preferred species of R$^1$ includes, inter alia, —CH$_3$, —CF$_3$, CH$_2$CF$_3$, —CF$_2$CF$_3$, —CF$_2$CF$_2$CF$_3$, —CF(CF$_3$)CF$_3$, and —CH$_2$CF$_2$CF$_3$. From the standpoint of reducing chances for chain transfer in radical polymerization, R$^1$ is preferably a group containing only a small number of hydrogen atoms.

From the standpoint of the ease of synthesis, R$^1$ referred to above is preferably —CH$_2$R$^3$ (wherein R$^3$ represents either an alkyl group of 1 to 19 carbon atoms optionally having 4 or less of oxygen atoms and being optionally substituted by fluorine, or a hydrogen atom). As preferred species of —CH$_2$R$^3$ above, there can be mentioned —CH$_2$CF$_3$, —CH$_2$CF$_2$CF$_3$, —CH$_2$(CF$_2$)$_2$CF$_3$, —CH$_2$(CF$_2$)$_3$CF$_3$, —CH$_2$(CF$_2$)$_4$CF$_3$, —CH$_2$(CF$_2$)$_5$CF$_3$, —CH$_2$(CF$_2$)$_6$CF$_3$, —CH$_2$(CF$_2$)$_7$CF$_3$, —CH$_2$(CF$_2$)$_8$CF$_3$, —CH$_2$(CF$_2$)$_9$CF$_3$, —CH$_2$CF$_2$CF$_2$H, —CH$_3$, —CH$_2$CH$_3$, and —CH$_2$CH$_2$CH$_3$. From the standpoint of reducing chances for chain transfer in radical polymerization, —CH$_3$ is preferred.

The fluorovinylether in which R$^1$ is —CH$_2$R$^3$ is preferably used in combination with tetrafluoroethylene [TFE].

Referring, further, to the fluorovinylether represented by the above general formula (I), in the sense that the chain transfer in radical polymerization may be sufficiently precluded, it is preferable that all the hydrogen atoms of said alkyl group R$^1$ be substituted by fluorine atoms, and such fluorovinylethers are perfluoro(alkylvinylethers) of the following general formula (II).

$$CF_2=CF-O-R_f^1 \quad (II)$$

(wherein R$_f^1$ represents a perfluoroalkyl group of 1 to 20 carbon atoms optionally having 4 or less of oxygen atoms). The oxygen atoms in said R$_f^1$ are preferably forming ether bonds.

The perfluoro(alkylvinylether) referred to above is preferably such that R$_f^1$ in the above general formula (II) is an oxygen-free perfluoroalkyl group. Regarding the number of carbon atoms of said perfluoroalkyl group R$_f^1$, the upper limit is preferably 8, more preferably 3. The preferred species of such R$_f^1$ are —CF$_3$, —CF$_2$CF$_3$, —CF$_2$CF$_2$CF$_3$, and —CF(CF$_3$)CF$_3$, and the more preferred species are —CF$_3$, —CF$_2$CF$_3$, and —CF$_2$CF$_2$CF$_3$, with —CF$_3$ being the still more preferred species because it may be gaseous and ready to polymerize.

Also preferred as the trifluorovinyl group-containing linear compound of the above general formula (III) is a trifluorovinyl group-containing linear compound represented by the following general formula (IV) [provided, however, that said fluorovinylether of general formula (I) is excluded].

$$CF_2=CF-(O-R_f^2)_n-Y^2 \quad (IV)$$

(wherein Y$^2$ represents an alkyl group of 1 to 5 carbon atoms optionally substituted by fluorine, an alkoxy group of 1 to 5 carbon atoms optionally substituted by fluorine, or a halogen atom; $R_f^2$ represents a straight-chain or branched-chain perfluoroalkylene group of 1 to 3 carbon atoms; n represents an integer of 0 to 5).

Referring to $Y^2$ in the above general formula (IV), the alkyl group optionally substituted by fluorine includes, inter alia, —$CH_3$ and $CF_3$; the alkoxy group optionally substituted by fluorine includes, inter alia, —$OCH_3$, —$OCF_3$, —$OCH_2CF_3$, and —$OCH_2CF_2CF_3$; and the halogen atom is preferably a fluorine atom or a chlorine atom. Referring, further, to the above general formula (IV), $R_f^2$ includes, inter alia, —$CF_2$—, —$CF_2CF_2$—, —$CF_2CF_2CF_2$—, and —$CF_2CF(CF_3)$—.

The trifluorovinyl group-containing linear compound represented by the above general formula (IV) is preferably a compound such that $Y^2$ in general formula (IV) is either an alkyl group of 1 to 5 carbon atoms, which may optionally be substituted by a fluorine atom, or a halogen atom and n is equal to 0. Among preferred species of such trifluorovinyl group-containing linear compound are TFE, chlorotrifluoroethylene, and hexafluoropropylene.

For attaining improvements in the low-temperature characteristics (for example, depressions in glass transition point) of the product fluorocopolymer, the above trifluorovinyl group-containing linear compound of general formula (IV) is preferably a compound such that said $R_f^2$ is —$CF_2CF_2CF_2$—, said $Y^2$ is $R_f^4$ (where $R_f^4$ represents a perfluoroalkoxy group of 1 to 5 carbon atoms), and said n is an integer of 1 to 4.

The preferred species of said trifluorovinyl group-containing linear compound of general formula (IV) includes $CF_3OCF_2CF_2CF_2OCF=CF_2$, $CF_3CF_2CF_2OCF_2CF_2CF_2OCF=CF_2$, $CF_3(OCF_2CF_2CF_2)_2OCF=CF_2$, $CF_3CF_2CF_2(OCF_2CF_2CF_2)_2OCF=CF_2$, $CF_3(OCF_2CF_2CF_2)_3OCF=CF_2$, $CF_3CF_2CF_2(OCF_2CF_2CF_2)_3OCF=CF_2$, $CF_3(OCF_2CF_2CF_2)_4OCF=CF_2$, and $CF_3CF_2CF_2(OCF_2CF_2CF_2)_4OCF=CF_2$.

The trifluorovinyl group-containing linear compound of general formula (IV) wherein $R_f^2$ is —$CF_2CF_2CF_2$—, $Y^2$ is $R_f^4$, and n is an integer of 1 to 4 is preferably used in combination with TFE.

From the standpoint of improving the low-temperature characteristics (for example, depressions in glass transition point) of the product fluorocopolymer, the preferred trifluorovinyl group-containing monomer includes $CF_3(OCF_2CF_2)_3 OCF=CF_2$, $CF_3O(CF_2O)_2CF_2CF_2OCF=CF_2$, $CF_3O(CF_2O)_4CF_2CF_2OCF=CF_2$, $CF_3O(CF_2O)_3CF_2CF_2OCF=CF_2$, $CF_3CF_2CF_2OCF_2OCF=CF_2$, and $CF_3CF_2OCF_2OCF=CF_2$.

In view of the applicability of the product fluorocopolymer as a precursor of polymers for forming various membranes, such as liquid-permeable membranes, gas-permeable membranes, ion exchange membranes for electrolytic processes, electrolyte membranes for fuel cells, dialysis membranes, reverse osmosis membranes, etc., the above trifluorovinyl group-containing monomer is preferably a monomer having the following general formula (V).

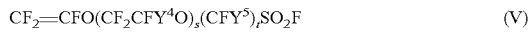

(wherein $Y^4$ represents a halogen atom or a perfluoroalkyl group; $Y^5$ represents a halogen atom; s represents an integer of 0 to 3; t represents an integer of 1 to 5).

The preferred species of said monomer of general formula (V) includes $CF_2=CFO(CF_2)_2SO_2F$, and $CF_2=CFO[CF_2CF(CF_3)O](CF_2)_2SO_2F$.

The above trifluorovinyl group-containing monomer (V) is preferably used in combination with TFE.

Furthermore, in view of the ease of synthesis, said trifluorovinyl group-containing monomer may be a trifluorovinyl group-containing compound having the following general formula (VI).

(wherein $R^{12}$ represents a halogenated hydrocarbon group having 1 to 19 carbon atoms, with one or more hydrogen being substituted by a chlorine, bromine or iodine atom. Furthermore, the above halogenated hydrocarbon group optionally has any or all of hydrogen atoms substituted by a fluorine atom). The preferred species of the above trifluorovinyl group-containing compound of general formula (VI) includes, inter alia, $CF_2=CFOCH_2CF_2CF_2Cl$, $CF_2=CFOCH_2CF_2CF_2Br$, and $CF_2=CFOCH_2CF_2CF_2I$.

As the above trifluorovinyl group-containing monomer, the compound wherein $R^1$ in the above general formula (I), the compound wherein $Y^2$ in the above general formula (IV), or the compound wherein $R^{12}$ in the above general formula (VI) is a hydrogen-containing group can be used as mentioned above but, in this case, the trunk chain end of the fluorocopolymer of the present invention may become —$CF_2H$ due to chain transfer in radical polymerization and consequently the polymerization reaction be terminated. Therefore, it is preferable to select a group having a low chain transfer tendency.

When two or more different species of said trifluorovinyl group-containing monomer are employed, these may be monomers of the same corresponding general formula mentioned above or different respectively corresponding general formulas. In cases where TFE is used, in order that said trifluorovinyl group-containing monomer may give a fluorocopolymer of the present invention which may be sufficiently elastomeric after cure, it is preferable to use a monomer of the above general formula (I) in combination with TFE.

As the trifluorovinyl group-containing monomer, it is the more preferable to use TFE and a fluorovinylether represented by the above general formula (I) in combination. In case the above fluorovinylether is, thus, used in combination with TFE, $R^1$ in the above general formula (I) representing the same is preferably selected from among the groups mentioned above by way of illustration, and more preferably $R^1$ is —$CH_3$ or —$CF_3$.

As said trifluorovinyl group-containing monomer, it is especially preferable to use TFE and a perfluoro(alkylvinylether) represented by the above general formula (II) in combination. In this case, $R_f^1$ in the above general formula (II) representing the perfluoro(alkylvinylether) is preferably selected from among the groups mentioned above by way of illustration, and more preferably $R_f^1$ is —$CF_3$.

As the above trifluorovinyl group-containing monomer, the species of high fluorine content are preferred. The higher the fluorine content is, the higher is the percentage of hydroxyl radicals converted to carboxyl groups in the total population of hydroxyl radicals derived from the polymerization initiator added to an ethylenically unsaturated double bond moiety of the trifluorovinyl group-containing monomer in radical polymerization. From this point of view, said trifluorovinyl group-containing monomer is more preferably a perfluoro compound in which all the hydrogen atoms attached to carbon atoms have been substituted by fluorine atoms and which may contain ether oxygen. However, perfluoro compounds are generally expensive, and in accordance with the present invention sufficiently curable fluorocopolymers of the present invention can be obtained even from fluoro compounds other than perfluoro compounds.

Also preferably, as said trifluorovinyl group-containing monomer, at least part of the monomer to be used is such that an oxygen atom is directly attached to the trifluorovinyl group constituting the ethylenically unsaturated double bond moiety. Use of such a trifluorovinyloxy group-containing monomer leads to superior copolymerizability.

In producing the fluorocopolymer of the present invention, a monomer other than said trifluorovinyl group-containing monomer can be used within the range not detracting from the effect of the present invention which is attributable to the use of said trifluorovinyl group-containing monomer. As such monomers other than said trifluorovinyl group-containing monomer, there can be mentioned ethylene, propylene, and vinylidene fluoride, among others.

The fluorocopolymer of the present invention has fluidity at room temperature. As used in this specification, the term "room temperature" means 0 to 50° C. Since the fluorocopolymer of the present invention has fluidity at room temperature as mentioned above, even shaped articles complicated in geometry can be easily formed therefrom and on-site molding is also feasible.

The fluorocopolymer of the present invention preferably has a viscosity of 0.1 to 2000 Pa·s at room temperature. When the viscosity is less than 0.1 Pa·s, the polymer chain length tends to be too short for adequate crosslinking, while exceeding 2000 Pa·s may not provide for fluidity at room temperature. The more preferred lower limit is 1 Pa·s and the more preferred upper limit is 1000 Pa·s. The "viscosity" referred to above is the viscosity value as measured with a type E viscometer. The fluorocopolymer having a viscosity lower than 0.1 Pa·s can be made into a copolymer having a viscosity value falling within the above-mentioned range by utilizing a chain extender, thus leading to expression of the same effect as that of the present invention.

Furthermore, the fluorocopolymer of the present invention preferably has a Mooney viscosity of 5 to 100 at room temperature. When this viscosity is less than 5, the polymer chain length tends to be too short for adequate crosslinking. On the other hand, if it exceeds 100, the copolymer may not have fluidity at room temperature. The more preferred upper limit is 75 and the still more preferred upper limit is 50. The term "Mooney viscosity" is used in this specification to mean the value found by the viscosity measurement with the Mooney viscometer (™, MV2000, manufactured by Monsanto) in accordance with JIS K6300 (1994).

Preferably the fluorocopolymer of the present invention has a number average molecular weight of 500 to 20000. If it is less than 500, the formation of a three-dimensional network structure by crosslinking may not be easily accomplished. If exceeds 20000, fluidity may not be expressed at room temperature. The more preferred lower limit is 900 and the more preferred upper limit is 10000. Because the fluorocopolymer of the present invention has a number average molecular weight within the above-mentioned range, the curing reaction can be easily conducted at room temperature. As used in this specification, the term "number average molecular weight" means the value found by measuring the carboxyl group concentration and calculating the average molecular weight value on the assumption that all ends are carboxyl groups.

That the fluorocopolymer of the present invention has such a comparatively low molecular weight can be ascertained from the fact that, in cases where a cure site exists at both ends of a trunk chain as will be explained hereinafter, the infrared absorption spectrum, for instance, shows that the intensity ratio of the absorption due to the cure site to the absorption due to the carbon-fluorine bond [C—F] at 2200 to 2600 $cm^{-1}$ is large. Taking the case in which the cure site is a carboxyl group as an example, the intensity ratio of the absorption due to the carbonyl group [C=O] at 1774 $cm^{-1}$ to the absorption due to said carbon-fluorine bond is not less than 5. In this specification, the number average molecular weight of the fluorocopolymer is sometimes expressed as "ultra-low molecular weight".

The fluorocopolymer of the present invention is a curable polymer. Because the fluorocopolymer of the present invention is thus curable, it can be used with advantage in such applications as rubbers and curable paints, among others. The fluorocopolymer of the present invention is curable on account of the presence of cure sites therein.

The term "cure site" as used in this specification means a functional group or bond capable of undergoing chemical change in curing reaction. The term "curing reaction" is intended in this specification to mean a reaction forming a bridging bond and an intermolecular trunk chain-trunk chain reaction of the fluorocopolymer of the present invention which reaction is not involved in the formation of a bridging bond. In this specification, said "reaction forming a bridging bond" is sometimes referred to as "crosslinking" and the site in a molecule which forms such a bridging bond is sometimes referred to as "crosslinking site". In this specification, the product resulting from curing of the fluorocopolymer subjected to said curing reaction is referred to as "cured article".

In the above curing reaction, said cure site is not only involved in the formation of a bond between the cure site of one molecule and the like cure site of another molecule of the fluorocopolymer of the present invention but usually binds to the crosslinking agent as well. There also are cases in which, depending on the number average molecular weight of the fluorocopolymer of the present invention used, a bond is formed between two cure sites within one and the same molecule of said fluorocopolymer.

The fluorocopolymer of the present invention preferably has said cure site at both ends of a trunk chain. Because such a fluorocopolymer has said cure site at both ends of a trunk chain, the above curing reaction results not only in the formation of a three-dimensional network structure but also enables the extension of the trunk chain by the bonding of the trunk chain end of one molecule to the trunk chain end of another molecule of said fluorocopolymer. As a consequence, despite its being a polymer of comparatively low molecular weight, this fluorocopolymer of the present invention may provide for an adequate interval between crosslinking sites, with the result that the cured article may have excellent elastomeric properties.

It is only necessary that the fluorocopolymer of the present invention has said cure site substantially at both ends of a trunk chain. The above expression that "the fluorocopolymer of the present invention has said cure site substantially at both ends of a trunk chain" means that while the great majority of said fluorocopolymer molecules have said cure site at both ends of a trunk chain, some of the molecules may have said cure site at only one of both ends of a trunk chain and only a small minority of the molecules may not have said cure site at any one of both ends of a trunk chain within the range not affecting the curing reaction. The fluorocopolymer described so far is the reaction product resulting from the polymerization of said trifluorovinyl group-containing monomer and is usually available as a mixture of molecules varying in molecular weight and copolymer composition, thus having said cure site "substantially" at both ends of a trunk chain. Unless otherwise indicated, the term "both ends" as used in this specification represents a concept subsuming the "substantially both ends" described above.

Because the fluorocopolymer of the present invention has said cure site at both ends of a trunk chain, it has substantially no trunk chain end indifferent to said curing reaction, thus depressions in the mechanical strength of the resulting cured article being precluded.

The cure site mentioned above includes, inter alia, a carboxyl group, an ester bond, a cyano group, an amide [—CONH$_2$] group, a hydroxyl group, an amino group, an epoxy group, a reactive halogen group, e.g. a chlorosulfonyl group or a chlorine atom, an iodine atom, a bromine atom, a hydrolysable silyl group, an unsaturated group, a cyclosiloxane structure-containing group, a silanol [—Si—OH] group, an isocyanato group, an acryloyl group, and a group represented by Si—H. The fluorocopolymer of the present invention may have only one kind or two or more different kinds of these but, in view of the ease of selection of the crosslinking method and the homogeneity of the resulting cured article, preferably has one and the same kind of cure site.

As regards the carboxyl group as said cure site, since the fluorocopolymer of the present invention is obtained from the trifluorovinyl group-containing monomer as mentioned above, the radical derived from the polymerization initiator adds itself easily to the ethylenically unsaturated double bond moiety of the trifluorovinyl group-containing monomer to introduce a cure site. That the fluorocopolymer of the present invention has carboxyl groups can be ascertained from the large absorption of the carbonyl group [—C(=O)—] at 1774 cm$^{-1}$ in infrared absorption spectrometry.

The ester bond as said cure site can be introduced, for example, in the form of an alkoxycarbonyl group by reacting the above-mentioned carboxyl group with an alcohol in the presence of an acid catalyst. The alkoxy moiety of said alkoxycarbonyl group may includes, inter alia, straight-chain or branched-chain alkoxy groups of 1 to 10 carbon atoms, the any of hydrogen atoms in which is substituted by a fluorine atom.

The preferred alkoxycarbonyl group is a methoxycarbonyl group [—COOCH$_3$] resulting from the reaction of the carboxyl group with methanol.

The cyano group and amide group, each as said cure site, can be introduced by transformation of the above methoxycarbonyl group. The method for this transformation includes, inter alia, the method described in WO 00/59959 which comprises permitting ammonia or aqueous ammonia to act upon the methoxycarbonyl group to generate the amide group and, then, converting this amide group to the cyano group in the presence of a dehydrating agent such as COF$_2$.

The hydroxyl group as said cure site can be introduced by, for example, reducing the carboxyl group in the conventional manner.

The unsaturated group as said cure site can be introduced by, for example, a decarboxylation reaction from the adjacent two carbon atoms at the trunk chain end.

The unsaturated group as said cure site may also be introduced by transformation of the alkoxycarbonyl group. As the method for this transformation, there may be mentioned an amidation process which comprises causing an unsaturated group-containing amine to react with the alkoxycarbonyl group as an example. The unsaturated group-containing amine mentioned just above is not particularly restricted but includes an amine having an allyl group or the like unsaturated group. Thus, for example, the unsaturated group-containing amine described in Japanese Kokai Publication 2001-81131 and the compound (5) disclosed in Japanese Kokai Publication Hei-08-198926 can be used.

As the unsaturated group introduced by the above-mentioned amidation process comprising reacting said unsaturated group-containing amine, there can be mentioned alkenyl groups such as vinyl, allyl, propenyl, isopropenyl, butenyl, isobutenyl, hexenyl, cyclohexenyl, and so forth. The above unsaturated group is not only capable of causing said curing reaction by way of, for example, the reaction with a Si—H group-containing compound, a photoreaction, or a radical reaction using a peroxide, for instance, but also can be transformed into a different cure site by, for example, the various alternative methods to be described hereinafter. As used in this specification, the above term "Si—H group" means any group consisting of a tetravalent silicon atom and one hydrogen atom attached to the silicon atom.

The cyclosiloxane structure-containing group as said cure site can be introduced by, for example, the process described in Japanese Kokai Publication Hei-11-5797 which comprises causing a cyclic siloxane compound to react with the above-mentioned unsaturated group. The cyclosiloxane structure-containing group mentioned above includes, inter alia, the groups represented by the following general formula:

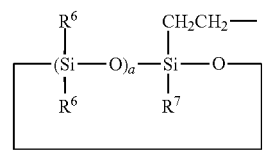

(wherein R$^6$ and R$^7$ may be the same or different and each represents a substituted or unsubstituted monovalent hydrocarbon group of 1 to 10 carbon atoms, preferably 1 to 8 carbon atoms; a represents an integer of 2 to 4). The above cyclosiloxane structure-containing group can for example be introduced as X$^1$ of the group represented by the formula;

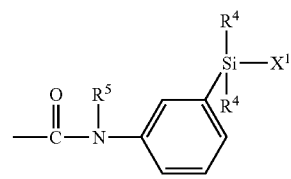

(wherein R$^4$ may be the same or different and each represents a substituted or unsubstituted monovalent hydrocarbon group of 1 to 10 carbon atoms, preferably 1 to 8 carbon atoms; R$^5$ represents a hydrogen atom or a monovalent hydrocarbon group of 1 to 10 carbon atoms, preferably 1 to 8 carbon atoms). The above-mentioned cyclosiloxane structure-containing group is capable of causing said curable reaction through the ring-opening reaction of the cyclosiloxane structure contained therein.

The cyclic siloxane compound mentioned above is not particularly restricted but includes, inter alia, the compounds represented by the general formula (2a) shown in Japanese Kokai Publication Hei-11-5797.

The silanol group [—Si—OH] as said cure site can be introduced by, for example, the procedure which comprises causing a hydrodiorganohalosilane to react with the above-mentioned unsaturated group for conversion of the latter to a group having —Si—Cl, for instance, and hydrolyzing this —Si—Cl-containing group.

The hydrodiorganohalosilane mentioned just above includes those hydrodiorganohalosilanes, such as hydrodiorganochlorosilane, which are represented by the general formula (4) in Japanese Kokai Publication Hei-11-292884. For the hydrolysis of said —Si—Cl-containing group, the procedure disclosed in Japanese Kokai Publication Hei-11-292884, which comprises permitting water to react with the group in the presence of a hydrogen chloride trapping agent, may for example be employed.

The epoxy group as said cure site can be introduced by, for example, a hydrosilylation reaction between said unsaturated group and a Si—H group-containing epoxy compound. The Si—H group-containing epoxy compound mentioned just above includes, inter alia, the compounds described in Japanese Kokai Publication Hei-11-80315. The fluorocopolymer having such epoxy groups is capable of causing said curing reaction via the ring-opening reaction of the epoxy groups. As used in this specification, the term "hydrosilylation reaction" means the addition reaction of the Si—H group to the carbon-carbon double bond.

The isocyanato group as said cure site can be introduced by, for example, the process which comprises chlorinating the carboxyl group to a chloroformyl group and causing it to undergo acid azidation reaction in the presence of hydrazoic acid-pyridine complex or the like and further to Curtius rearrangement. This serial process may for example be followed in accordance with the protocol described in Scheme 1, Journal of Fluorine Chemistry, Vol. 41, 1988, pp. 175-178. The isocyanato group causes said curing reaction when reacted with an alcohol, a thiol, an amine, a carboxylic acid, or an unsaturated compound such as an enamine.

The hydrolysable silyl group as said cure site can be introduced by, for example, permitting an aminosilane to react with the alkoxycarbonyl group. The aminosilane mentioned just above includes, inter alia, compounds represented by the following general formula:

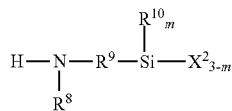

(wherein $R^8$ represents a substituted or unsubstituted monovalent hydrocarbon group or a hydrogen atom; $R^9$ represents a divalent organic group; $R^{10}$ represents a substituted or unsubstituted monovalent hydrocarbon group; $X^2$ represents a hydrolysable group; m represents an integer of 1 to 3. The m of $R^{10}$ groups may be the same or different; (3-m) of $X^2$ groups may be the same or different). The group —$S^1$—$X^2$, in the above general formula, is a hydrolysable silyl group. As said aminosilane, there can be used, inter alia, the compound obtained by reacting a compound of the general formula (5) shown in Japanese Kokai Publication Hei-08-198926 with an organohydrogensilane which will be described hereinafter.

The hydrolysable silyl group as said cure site may also be introduced by causing an organohydrogensilane to react with said unsaturated group. The organohydrogensilane mentioned just above is not particularly restricted but includes compounds represented by the general formula (5) in Japanese Kokai Publication Hei-09-77777.

The above-mentioned hydrolysable silyl group includes, inter alia, —Si—X (X represents a halogen atom such as chlorine) and —Si—OR (R represents a monovalent hydrocarbon group such as an alkyl group). The above hydrolysable sily group can be hydrolyzed to a silanol group [—Si—OH] which undergoes dehydrative condensation to thereby cause said curing reaction. The acryloyl group as said cure site can be introduced by, for example, the method described in Japanese Kokai Publication Hei-07-233180 which comprises reacting an acryloyl group-containing silane compound with said hydrolysable silyl group. The above-mentioned acryloyl group-containing silane compound includes, inter alia, compounds represented by the general formula (3) in Japanese Kokai Publication Hei-07-233180. The acryloyl group mentioned above may cause said curing reaction by addition reaction in the presence of light, a photopolymerization initiator, a peroxide compound, or the like.

The Si—H group as said cure site can be introduced by a method which comprises reacting said unsaturated group with a compound having 2 or more of Si—H groups per molecule.

The other kinds of cure sites can also be introduced by the conventional methods.

Referring, further, to said cure site, the site preferred from the standpoint of the ease of introduction and the high reactivity leading to the ease of taking part in the curing reaction includes, inter alia, the carboxyl group, ester bond, cyano group, hydroxyl group, iodine atom, bromine atom, hydrolysable silyl group, unsaturated group, acryloyl group, and Si—H group, with the carboxyl group, ester bond, cyano group, hydroxyl group, hydrolysable silyl group, and unsaturated group being still more preferred. In consideration of the ease of introduction, the carboxyl group is particularly preferred.

The fluorocopolymer of the present invention may be a copolymer having such cure sites not only at both ends of a trunk chain but also partway of the trunk chain. In this specification, the above term "partway of the trunk chain" represents a concept subsuming both the case of direct attachment to a carbon atom other than the carbon atoms at both ends of a trunk chain among the carbon atoms constituting the trunk chain and the case of presence in a side chain. Between the above two cases of the presence partway of the trunk chain, the presence in a side chain is preferred from the standpoint of the ease of taking part in the curing reaction.

Because the fluorocopolymer of the present invention has such cure sites as above not only at both ends but also partway of the trunk chain, it may effectively form a three-dimensional network structure, particularly in cases where, as the curing agent, a polyfunctional compound having 3 or more curing functional groups per molecule, which will be described hereinafter, is not used or used only sparingly. From the standpoint of the ease of curing at room temperature, the preferred kinds of cure sites which may be present partway of the trunk chain of said fluorocopolymer are iodine and bromine atoms.

The technology for introducing said cure site or sites partway of the trunk chain of said fluorocopolymer include, inter alia, the method for use in the case where said cure site is an iodine atom and/or a bromine atom, which comprises copolymerizing a monomer containing an iodine atom and/or a bromine atom (hereinafter referred to as "introduction method 1") and the method for use in the same case as above which comprises using an iodine compound or a bromine compound as a polymerization initiator or a chain transfer agent (hereinafter referred to as "introduction method 2") In the present invention, one object of which is low-cost production, said introduction method 1 is preferred to said introduction method 2, for both iodine compound and bromine compound for use as the polymerization initiator or chain transfer agent are expensive.

The iodine atom and/or bromine atom-containing monomer which can be used in said introduction method 1 includes, inter alia, the monomers mentioned in Japanese Kokoku Publication Hei-05-63482, Japanese Kokai Publication Hei-04-288305, Japanese Kokoku Publication Sho-53-

4115, etc. Thus, for example, $CF_2=CFOCF_2CF_2CH_2I$, $CF_2=CFOCF_2(CF_3)CFOCF_2CF_2CH_2I$, $CF_2=CFI$, $CF_2=CHBr$, $CH_2=CHCF_2CF_2Br$, $CF_2=CFOCF(CF_3)CF_2OCF_2Br$, etc. can be used. For the same reason as mentioned for the use of said trifluorovinyl group-containing monomer, those monomers having a trifluorovinyl group are particularly preferred in the practice of the present invention.

The above iodine atom and/or bromine atom-containing monomer is preferably copolymerized in such a proportion that the iodine atoms and/or bromine atoms introduced into the fluorocopolymer of the present invention will account for 0.01 to 10 mass % based on the solid matter of the copolymer. If the above proportion is less than 0.01 mass %, there may be cases in which the formation of a three-dimensional network structure due to such introduction of iodine and/or bromine cannot be effectively materialized. If 10 mass % is exceeded, the final cured article tends to be lacking in elastomeric characteristics. The more preferred lower limit is 0.05 mass % and the more preferred upper limit is 7 mass %.

The technology which can be used for introducing said cure site into the fluorocopolymer partway of its trunk chain in cases where the cure site is neither an iodine atom nor a bromine atom includes not only the above-mentioned methods involving transformations from other kinds of cure sites but also methods in which a cure site-containing monomer having a cure site to be introduced is polymerized with said trifluorovinyl group-containing monomer.

The cure site-containing monomer mentioned just above is not particularly restricted but includes, inter alia, the ethylenic monomers represented by the following general formulas:

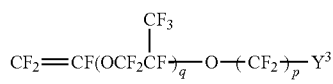

(wherein q represents an integer of 0 to 5; p represents an integer of 1 to 8)

(wherein q represents an integer of 1 to 5)

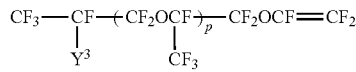

(wherein p represents an integer of 1 to 4)

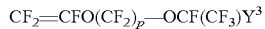

(wherein p represents an integer of 2 to 5)

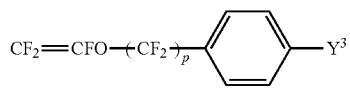

(wherein p represents an integer of 1 to 6)

(wherein p represents an integer of 1 to 2), or

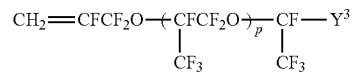

(wherein p represents an integer of 0 to 3)

(In each of the above formulas, $Y^3$ represents an alkoxycarbonyl group of 1 to 10 carbon atoms optionally having carboxyl, cyano or fluorine). Among these, monomers having a trifluorovinyl group are preferred for the same reason as mentioned for said trifluorovinyl group-containing monomer.

The method of producing the fluorocopolymer according to the present invention comprises subjecting said trifluorovinyl group-containing monomers to radical polymerization by using a polymerization initiator to give said fluorocopolymer.

The technology which can be used for the above radical polymerization includes the known methods, such as emulsion polymerization, suspension polymerization, and solution polymerization, although emulsion polymerization is preferred. For the production of said fluorocopolymer whose cure sites have carboxyl groups, the emulsion polymerization method is preferred at the above radical polymerization because the hydroxyl radical added is easily converted to a carboxyl group on hydrolysis.

The polymerization initiator mentioned above has a function to impart curability to said fluorocopolymer. The term "function to impart curability" means the function to render said fluorocopolymer capable of a curing reaction. The curing reaction mentioned just above is the reaction described above in connection with the cure site.

The polymerization initiator mentioned above is preferably one having a function to impart curability to said fluorocopolymer by disposing a cure site at a trunk chain end of the fluorocopolymer. The expression "disposing a cure site" represents a concept subsuming both of the mode of introducing cure sites de novo into the fluorocopolymer having no cure sites and the mode of transforming cure sites so introduced de novo into different kinds of cure sites. The technology of causing cure sites to be present includes, inter alia, the introduction methods described hereinbefore with regard to the cure sites of the fluorocopolymer of the present invention.

The cure sites referred to above are those described hereinbefore in connection with the fluorocopolymer of the present invention, and from the standpoints of the ease of introduction and the high reactivity providing for the ease of taking part in the curing reaction, the carboxyl group, ester bond, cyano group, hydroxyl group, iodine atom, bromine atom, hydrolysable silyl group, unsaturated group, acryloyl group, and Si—H group are preferred, and the carboxyl group, ester bond, cyano group, hydroxyl group, hydrolysable silyl group, and unsaturated group are more preferred, with the carboxyl group being particularly preferred from the standpoint of the ease of introduction.

The method of producing the fluorocopolymer according to the present invention may be one conducive to formation of a fluorocopolymer having cure sites, described above, not only at both ends of a trunk chain but also partway of the trunk chain.

As said polymerization initiator, the known initiators can be employed. For example, it is preferable to use a water-soluble radical initiator capable of adding a carboxyl group to the trifluorovinyl group of a trifluorovinyl group-containing monomer which is to constitute the trunk chain end of the product fluorocopolymer. The water-soluble radical initiator mentioned just above may be an initiator causing a group capable of generating a carboxyl group to be present at said trunk chain end. The group capable of generating a carboxyl group includes, inter alia, —COF, —COCl, and —CF$_2$OH, all of which are invariably capable of generating a carboxyl group in the presence of water.

The water-soluble radical initiator mentioned above is preferably a peroxide compound. The peroxide compound includes, inter alia, persulfates such as ammonium persulfate [APS], potassium persulfate [KPS], etc., either as used alone or as used in combination with a reducing agent such as sodium sulfite, that is to say a redox initiator, although the use of a persulfate is preferred. Depending on the reaction conditions used for radical polymerization, such as the pH of the medium, a persulfate is capable of generating a hydroxyl radical. As said water-soluble radical initiator, hydrogen peroxide can also be used with advantage.

For the purpose of reducing the amount of metal in the fluorocopolymer, the fluorocopolymer curable composition to be described hereinafter, and the cured article also to be described hereinafter, ammonium persulfate; a redox initiator consisting of ammonium persulfate and ammonium sulfite; or hydrogen peroxide is preferably used as said water-soluble radical initiator.

The above-mentioned water-soluble radical initiators can be used each alone or in a combination of two or more species.

Regarding the formulating amount of said polymerization initiator, in order that a fluorocopolymer of comparatively low molecular weight may be obtained, the initiator is preferably used in a larger amount than usual, i.e. in a proportion of 0.001 to 5 parts by mass to each 100 parts by mass of the solvent, such as water, which is used in the radical polymerization. If the formulating amount is less than 0.001 part by mass, there will be cases in which the resulting polymer gains so much in molecular weight that it does not express fluidity at room temperature or cases in which the cure sites on the fluorocopolymer are so few that the curing reaction does not proceed to a sufficient extent. If the formulating amount exceeds 5 parts by mass, a wholesome emulsion state, which is necessary for emulsion polymerization, may not be established so that the polymerization reaction does not proceed well, resulting in partial polymerization. The more preferred lower limit of the formulating amount of said polymerization initiator is 0.01 part by mass and the more preferred upper limit is 1 part by mass, based on each 100 parts by mass of the solvent used for the polymerization reaction.

In order that a fluorocopolymer of ultra-low molecular weight may be obtained, the above formulating amount of the polymerization initiator is designed to be exceedingly large as compared with the cases in which ordinary kinds of polymers of high molecular weight are to be produced, and the polymerization reaction is carried out with the concentration of the trifluorovinyl group-containing monomer to be used as the monomer being controlled low enough relative to said polymerization initiator. The radical polymerization according to the present invention is restricted in the sense that, for holding the molecular weight of the resulting polymer sufficiently low, it is preferable to refrain from using a chain transfer agent which is used in the conventional polymerization as far as possible as will be explained hereinafter, but by using said polymerization initiator in a formulating amount within the above-mentioned range, a fluorocopolymer of ultra-low molecular weight can be efficiently obtained.

The trifluorovinyl group-containing monomer is one which has been described hereinbefore with regard to the fluorocopolymer of the present invention, and two or more different species of said monomer are used in the method of producing a fluorocopolymer according to the present invention. The preferred species of said trifluorovinyl group-containing monomer are those mentioned hereinbefore as being preferred for the fluorocopolymer of the present invention, and TFE and the perfluoro(alkylvinylether) of general formula (II), in particular, are used with advantage.

The radical polymerization mentioned above is preferably carried out at 5 to 120° C. If the temperature is lower than 5° C., it may prove that the reaction is too much retarded for commercial purposes or there will be cases in which the resulting polymer will gain so much in molecular weight that fluidity at room temperature may not be expressed. Exceeding 120° C. will not be rewarded with any remarkable advantage.

In the general radical polymerization, a chain transfer agent is usually employed for molecular weight control. Such a chain transfer agent may be used in conducting the radical polymerization reaction according to the present invention as well, but it is advisable to avoid using a chain transfer agent as far as possible, for otherwise the proportion of cure sites, such as carboxyl groups, which may be introduced into the both ends of a trunk chain of the resulting fluorocopolymer will be decreased. However, this admonition does not apply if the chain transfer agent is a substance capable of disposing cure sites, such as carboxyl groups, at the both ends of a trunk chain.

The radical polymerization according to the present invention, when conducted in the absence of a chain transfer agent, can be carried out at low pressure, for example less than 2 MPa·G, preferably not over 1 MPa·G, for successful molecular weight control. Moreover, in conducting the above radical polymerization, the molecular weight of the resulting copolymer can be controlled by adjusting the stirring speed judiciously and varying the solubility of the trifluorovinyl group-containing monomer in the radical polymerization medium. Other polymerization conditions are not particularly restricted.

The method of producing a fluorocopolymer according to the present invention being as described above, the polymerization reaction takes place in the presence of an unprecedentedly large amount of a polymerization initiator under conditions conducive to a rapid decomposition yielding a large quantity of radicals while the concentration of the trifluorovinyl group-containing monomer is held relatively low. As a result, the molecular weight of the resulting fluorocopolymer is low enough for the expression of fluidity at room temperature and good curability is insured by the presence of cure sites, e.g. carboxyl groups, preferably at both ends of a trunk chain.

The radical polymerization in the method of producing a fluorocopolymer according to the present invention is preferably carried out at pH not less than 2. At pH lower than 2, the polymerization rate is excessively depressed with the consequent disadvantage in commercial-scale production. The more preferred lower limit of said pH is 2.5, while the preferred upper limit is pH 8 and the more preferred upper limit is pH 7. In this specification, the above-mentioned pH is the value found with an ordinary pH-meter.

The mechanism accounting for the advantage of conducting the radical polymerization within the above pH range according to the present invention is not definitely clear but the following mechanism is suspected to be at work.

Thus, in radical polymerization, whereas increasing the amount of a polymerization initiator generally leads to an increased polymerization rate, the polymerization rate is decreased despite the use of an unusually large amount of polymerization initiator in the present invention as pointed out above and, in the emulsion polymerization, the pH of the emulsion system is depressed drastically. This pH depression is probably attributed to the following mechanism. Thus, in the present invention, the hydroxyl radical adds itself to an ethylenically unsaturated double bond moiety and is instantly transformed to a carboxyl group by hydrolysis, with the release of 2 equivalents of HF per an equivalent of carboxyl group, with the result that 3 moles of acidic component are generated per end. Moreover, in the radical polymerization according to the present invention, it is preferable to increase the concentration of ends to an exceptionally high level for realizing an ultra-low molecular weight and this exerts a considerable influence on the pH etc. of said emulsion. It is generally known that a persulfate is decomposed by a mechanism not generating a radical under acidic conditions and it is conjectured that the absence of generation of effective radicals in this case, too, is the cause for the decreased polymerization rate.

After much research, the inventors of the present invention found that in the case where said emulsion polymerization method is used for said radical polymerization, the polymerization rate can be increased by controlling the pH of the emulsion within the above-defined range. In this manner, said radical polymerization can be carried out steadily, efficiently, and continuously.

The radical polymerization according to the present invention is preferably carried out with addition of an alkaline compound. The method of controlling the pH within the above range is not particularly restricted but the expedient and effective pH control can be attained by the addition of said alkaline compound.

The term "alkaline compound" is used in this specification to mean a water-soluble compound such that, when dissolved alone in water, it gives an aqueous solution over pH 7. The alkaline compound mentioned above may be whichever of an organic compound and an inorganic compound. The alkaline compound is not particularly restricted. The inorganic compound includes, inter alia, alkali metal hydroxides such as NaOH, KOH, etc.; alkaline earth metal hydroxides such as Mg $(OH)_2$, CA$(OH)_2$, etc.; and salts having buffer activity, such as disodium hydrogenphosphate, etc. and the organic compound includes ammonia, amines, and so forth.

For the purpose of suppressing the metal contents of the fluorocopolymer, the fluorocopolymer curable composition to be described hereinafter, and the cured article also to be described hereinafter, the above-mentioned alkaline compound is preferably ammonia or a metal-free amine compound.

The above alkaline compound can be used either one species exclusively or in a combination of 2 or more species.

The method of adding said alkaline compound is not particularly restricted but includes, inter alia, the method which comprises monitoring the pH of the polymerization reaction mixture in the course of radical polymerizaiton and adding said alkaline compound either en bloc, in several installments, or continuously so as to bring the pH into the above range.

Though not restricted, the radical polymerization according to the present invention can be conducted in a reaction vessel lined with a corrosion-resisting material, for instance. The corrosion-resisting material mentioned just above is not particularly restricted but includes, inter alia, a fluororesin such as polytetrafluoroethylene and a nickel-molybdenum alloy such as Hastelloy™.

While the fluorocopolymer produced can be obtained by the conventional freeze coagulation or salt coagulation technique, it is preferably one obtained by coagulation with an acid of an emulsion resulting from radical polymerization. Depending upon polymerization conditions, the carboxyl group of the product polymer may have formed a metal salt or an ammonium salt instead of being in the free form, but such salt can be converted to a free carboxyl group.

The acid for use in said coagulation is preferably a mineral acid. The mineral acid mentioned just above includes, inter alia, hydrochloric acid, sulfuric acid, and nitric acid.

Since the fluorocopolymer thus obtained has either carboxyl groups or any of ester bonds, hydroxyl groups, cyano groups, and other cure sites as transformed from said carboxyl groups, preferably at both ends of a trunk chain, it can be cured by causing them to react with curing functional groups capable of taking part in said curing reaction, such as amino, isocyanato, alkoxysilyl or other groups. The curing functional groups mentioned above can be caused to take part in the curing reaction by selecting a known crosslinking agent such as diaminophenyl, aminophenol or aminothiophenol, for instance.

The method of causing the fluorocopolymer of the present invention to cure includes, inter alia, the method described in Japanese Kokai Publication Hei-10-110079, that is a method analogous to the method comprising reacting a methoxycarbonyl group-containing polymer with a diamine to cause said polymer to cure.

In order to cure the fluorocopolymer of the present invention, a three-dimensional network structure is formed. In the case where said fluorocopolymer has a cure site at both ends of a trunk chain, a polyfunctional compound having 3 or more of said curing functional groups per molecule is preferably used as a crosslinking agent for the formation of said three-dimensional network structure. However, such cure sites may be introduced partway of the trunk chain by copolymerizing a monomer having a cure site in the stage of production of the fluorocopolymer of the present invention in conjunction with, or in lieu of, the use of said polyfunctional compound. With regard to said polyfunctional compound and other crosslinking agent, the crosslinking agent for use in the fluorocopolymer curable compositions to be described hereinafter, for instance, may be employed.

Since the fluorocopolymer of the present invention can be caused to cure in this manner and the resulting cured article has elastomeric properties, the copolymer can be used with advantage as a fluoroelastomer for rubber use.

The above fluorocopolymer can also be used as a reactive processing aid for addition to high-molecular-weight polymers or, by taking advantage of the carboxyl group disposed at both ends of a trunk chain, as a modifying agent for engineering plastics such as fluorine-containing polyamides. It may further be dissolved in a solvent or dispersed in a aqueous medium together with a crosslinking agent for use as a paint.

Furthermore, by adding an insulating inorganic powder to the fluorocopolymer of the present invention, there can be prepared a heat-dissipating material which is very satisfactory in cleanliness and outgas properties. The inorganic powder mentioned just above includes, inter alia, heat-conductive fillers. The heat conductivity can be increased by formulating such a heat-conductive filler. The heat-conductive filler includes, inter alia, metal oxides such as aluminum oxide, zinc oxide, titanium oxide, beryllium oxide, magnesium oxide, nickel oxide, vanadium oxide, copper oxide, iron oxide, silver oxide, etc.; silicon compounds such as quartz powder, silicon carbide, silicon nitride, mica, etc.; and nitrogen compounds such as boron nitride, aluminum nitride, and so forth.

Moreover, the fluorocopolymer of the present invention can be supplemented with an electrically conductive filler to prepare electromagnetic wave shielding materials very satisfactory in cleanliness and outgas properties.

The conductive filler mentioned above includes, inter alia, various metals such as gold, silver, copper, nickel, iron, cobalt, lead, magnesium, titanium, stainless steel, etc.; carbon blacks such as Ketjenblack, acetylene black, etc.; and carbon. The morphology of said conductive filler includes, inter alia, granules, powders, short filaments or other fibers, and flakes, and the powdery, fibrous, and flaky ones are preferred.

The fluorocopolymer of the present invention can be used as a rubber crosslinking agent by reacting it with a silylated aniline in the presence of a catalyst, such as triethylamine, to introduce an Si—H group into its end. The silylated aniline mentioned above includes, inter alia, the compounds mentioned in Japanese Kokai Publication 2000-34293. The rubber mentioned above includes, inter alia, silicone rubbers, fluorosilicone rubbers, and fluorocopolymers which have an unsaturated group at an end as the cure site, polymers having an unsaturated group at an end and containing a perfluoropolyether structure in the trunk chain, and other rubbers which cure through a hydrosilylation reaction.

In the case where the fluorocopolymer of the present invention has a carboxyl group at both ends of a trunk chain, it can be used as a chain extender for epoxy resins, isocyanate resins, oxazoline resins, etc., preferably as a chain extender for epoxy resins. The epoxy resins mentioned above may be any of the glycidyl ether type, glycidyl ester type, glycidyl amine type, and alicyclic type resins (Japanese Kokai Publication Hei-11-322842).

Where necessary, the fluorocopolymer may be in the form of a dispersion in an aqueous medium or a solution in an organic solvent, and such a solution or dispersion can be used as a coating agent. The aqueous medium mentioned above may be a mixture of water and an organic solvent.

A multiple-layer article comprising a substrate and a coating layer formed thereon by coating with said coating agent is also another aspect of the present invention. The substrate mentioned just above is not particularly restricted but includes substrates made of inorganic materials, such as metals, ceramics, etc.; and substrates made of resins. The method for said coating includes the hitherto-known coating methods, injection molding method, and dispenser-molding/heating method.

A base material-unified molding article obtained by dispenser-molding a composition comprising said fluorocopolymer on a substrate is also another aspect of the present invention. The base material-unified molding article mentioned above includes gaskets, packings, and equivalents thereof. The above base material-unified molding article contains a substrate. The substrate mentioned just above is not particularly restricted but includes substrates made of inorganic materials such as metals and ceramics. The above base material-unified molding article may also be a one-piece molding with a resin as produced by coating, injecting or dispenser-molding a composition comprising said fluorocopolymer on the resin and heating the same.

The fluorocopolymer curable composition (A) of the present invention comprises a fluorocopolymer and a crosslinking agent, in which said crosslinking agent accounts for 0.1 to 10 parts by mass (as solids) relative to 100 parts by mass as solids of said fluorocopolymer.

Since the fluorocopolymer curable composition (A) of the present invention comprises a fluorocopolymer having fluidity at room temperature as mentioned above, it is fluid enough and particularly sited for the formation of shaped articles much complicated in geometry, and by selecting a curing system providing for the progress of curing at low temperature, it can be utilized in field or on-site molding applications as well.

As mentioned above, the fluorocopolymer is preferably one obtainable from TFE and said perfluoro(alkylvinylether) of general formula (II), and the fluorocopolymer curable composition (B) is a curable composition comprising this fluorocopolymer. Furthermore, said fluorocopolymer curable composition (B) is preferably one further comprising a crosslinking agent.

The above fluorocopolymer curable composition (A) and fluorocopolymer curable composition (B) will now be described in detail as "the fluorocopolymer curable composition" without distinguishing between the two compositions insofar as matters applicable to these (A) and (B) in common are concerned.

The crosslinking agent for use in the fluorocopolymer curable composition is not particularly restricted provided that it is a polyfunctional compound having, within its molecule, a plurality of curing functional groups capable of reacting with the cure sites of the fluorocopolymer which may for example be carboxyl groups, amino groups or hydroxyl groups. However, in order that sufficient crosslinking may be attained, it is preferable to use polyfunctional compounds corresponding to the various kinds of cure sites of the fluorocopolymer as described below.

In the case where said cure sites are carboxyl groups, the crosslinking agent includes, inter alia, a polyamine compound, a polyisocyanate compound, and a polyepoxy compound; in the case where said cure sites are amino groups, the crosslinking agent includes, inter alia, a polycarboxylic acid compound, a polyepoxy compound, and a polyisocyanate compound; in the case where said cure sites are hydroxyl groups, the crosslinking agent includes, inter alia, an acid anhydride, a polyepoxy compound, and a polyisocyanate compound; in the case where said cure sites are epoxy groups, the crosslinking agent includes, inter alia, a polyamine compound, a polycarboxylic acid compound, and a polyol compound; in the case where said cure sites are reactive halogen groups, the crosslinking agent includes, inter alia, a polyamine compound; and in the case where said cure sites are unsaturated groups, iodine atoms or bromine atoms, the crosslinking agent includes, inter alia, an organic peroxide and a photoinitiator.

The polyamine compound which can be used as said crosslinking agent in the case where said cure sites are carboxyl groups includes, inter alia, such polyamines as hexamethylenediamine, triethylenetetramine, triethylenediamine, etc. and a polyamine salt-guanidine derivative combination. The isocyanate compound which can be used includes, inter alia, tolylene diisocyanate, diphenylmethane diisocyanate, and hexamethylene diisocyanate. The polyisocyanate compound mentioned just above may be a prepolymer or a blocked compound which provides for a freedom of choice of curing temperature. The above crosslinking agent further includes the use of an epoxy compound in combination with a quaternary ammonium salt, a quaternary phosphonium compound, or a basic compound.

The polycarboxylic acid compound which can be used as the crosslinking agent in the case where said cure sites are amino groups include, inter alia, phthalic acid and pyromellitic acid; the polyepoxy compound which can be used includes, inter alia, novolak type, bisphenol A type, and bisphenol AF type compounds; and the polyisocyanate compounds includes, inter alia, tolylene diisocyanate, diphenylmethane diisocyanate, and hexamethylene diisocyanate. The above polycarboxylic acid compound and polyepoxy compound may be prepolymers. The above polyisocyanate compound may be a prepolymer or a blocked compound which provides for a freedom of choice of curing temperature.

In the case where said cure sites are hydroxyl groups, the acid anhydride which can be used as the crosslinking agent includes, inter alia, pyromellitic anhydride, tetrahydrofuran-tetracarboxylic anhydride, and benzophenonetetracarboxylic anhydride; the polyamine compound which can be used includes, inter alia, hexamethylenediamine, triethylenetetramine, and triethylenediamine; and the polyisocyanate compound which can be used includes, inter alia, tolylene diisocyanate, diphenylmethane diisocyanate, and hexamethylene diisocyanate. The polyisocyanate compound mentioned just above may be a prepolymer or a blocked compound which provides for a freedom of choice of curing temperature. The crosslinking agent may further be a polycarboxylic acid, such as adipic acid, and an alkoxymethylmelamine, such as methoxymethylmelamine.

Referring to the case in which said cure sites are epoxy groups, the polyamine compound which can be used as the crosslinking agent includes, inter alia, polyamines such as hexamethylenediamine, triethylenetetramine, triethylenediamine, and organic carboxylic acid ammonium salts, salts of polyamines, salts of dithiocarbamic acid; and the combination use of a polycarboxylic compound and a quaternary ammonium salt, a quaternary phosphonium salt, or a basic compound, the combination use of an imidazole derivative and an alkylsulfuric acid salt or an alkylsulfonic acid salt; and the combination use of a polyamine or guanidine derivative and sulfur or a sulfur-donating compound.

Referring to the case in which said cure sites are reactive halogen groups, the combination use of a polyamine, a polyamine salt or a fatty acid alkali metal salt and sulfur or a sulfur donating compound and the combination use of trithiocyanuric acid and a fatty acid metal salt, dicyandiamide, a metal oxide, a dithiocarbamic acid salt, or a thiuram compound, among others, can be mentioned.

In order that sufficient crosslinking may be attained, the above crosslinking agent is preferably a polyfunctional compound having at least 2, or not less than 3 where necessary, curing functional groups per molecule. The polyfunctional groups having 2 curing functional groups acts as a chain extender for extending the trunk chain of the fluorocopolymer and the polyfunctional compound having 3 to 4 curing functional groups may act as a crosslinking agent. In the case where the fluorocopolymer has a cure site at both ends of a trunk chain, it is good practice to use said compound having 2 curing functional groups and said compound having 3 to 4 curing functional groups in admixture. In the case where fluorocopolymer has cure sites partway of the trunk chain, it is curable by itself and, therefore, a polyfunctional compound having 2 curing functional groups only may be used.

The crosslinking agent mentioned above can be used one species only or in a combination of 2 or more species.

The level of addition of said crosslinking agent is 0.1 to 10 parts by mass relative to 100 parts by mass of the solid matter of said fluorocopolymer. If the level is less than 0.1 part by mass, no sufficient crosslinking can be achieved. If it exceeds 10 parts by mass, the crosslinking reaction will not proceed in a measure commensurate with the level of addition. The preferred lower limit is 0.5 part by mass and the preferred upper limit is 8 parts by mass.

The above fluorocopolymer curable composition can be used for crosslinking by ultraviolet radiation and, in this case, the preferred composition contains a crosslinking aid in addition to said fluorocopolymer and crosslinking agent. Usually, a photoinitiator is used as said crosslinking agent and a polyfunctional unsaturated compound is used as said crosslinking aid. As the fluorocopolymer, one having iodine and/or bromine atoms as cure sites is preferred because of its high reactivity to ultraviolet rays, and such iodine and/or bromine atoms may be disposed at both ends of a trunk chain but are preferably disposed partway, i.e. intermediate sites, of the trunk chain because such a fluorocopolymer can be obtained at low cost.

As the photoinitiator mentioned above, the known photoinitiators which are used for UV-crosslinking can be utilized. Thus, the photoinitiator is not particularly restricted but includes, inter alia, acetophenone series initiators such as chloroacetophenone, diethoxyacetophenone, α-aminoacetophenone, etc., and hydroxyacetophenone compounds, e.g. 2-hydroxy-2-methyl-1-phenylpropan-1-one, 1-(4-isopropylphenyl)-2-hydroxy-2-methylpropan-1-one, 1-hydroxycyclohexyl phenyl ketone, etc.; benzoin series initiators such as benzoin, benzoin ethers, benzyl dimethyl ketal, etc.; benzophenone series initiators such as benzophenone, benzoyl benzoate, hydroxybenzophenone, 4-phenylbenzophenone, acrylated benzophenone, etc.; thioxanthone series initiators such as thioxanthone, 2-methylthioxanthone, 2,4-dimethylthioxanthone, etc.; and others, e.g. α-acyloxime esters, acylphosphine oxide, benzil, camphorquinone, 2-ethylanthraquinone, and Michler's ketone.

The level of use of said photoinitiator may be 0.1 to 10 parts by mass relative to 100 parts by mass as solids of said fluorocopolymer, as mentioned above for the crosslinking agent to be formulated in said fluorocopolymer curable composition, but is generally about 0.05 to 10 parts by mass. The preferred lower limit is 1 part by mass and the preferred upper limit is 5 parts by mass.

In the case where a benzophenone series or thioxanthone series photoinitiator is used, a hydrogen donor may be added as an auxiliary photoinitiator. The hydrogen donor includes aliphatic amines such as triethanolamine, methyldiethanolamine, triisopropanolamine, etc.; and aromatic amines such as 4,4'-diethylaminophenone, ethyl 4-dimethylaminobenzoate, (n-butoxy)ethyl 4-dimethylaminobenzoate, etc. can be mentioned.

The level of use of the auxiliary photoinitiator is generally about 0.05 to 10 parts by mass relative to 100 parts by mass as solids of said fluorocopolymer. The preferred lower limit is 0.5 parts by mass and the preferred upper limit is 5 parts by mass.

The polyfunctional unsaturated compound for use as said auxiliary crosslinking agent need only be a compound which is reactive with both the polymer radical resulting from the iodine and/or bromine atom generated upon irradiation with UV light, and the radical resulting from the photoinitiator and is not particularly restricted in kind. The preferred polyfunctional unsaturated compound includes, inter alia, various diacrylates, trimethylolpropane triacrylate [TMPTA], trimethylolpropane trimethacrylate, triallyl isocyanate [TAIC], triallyl cyanurate, triallyl trimellitate, pentaerythritol triacrylate, pentaerythritol tetraacrylate, dipentaerythritol hexaacrylate, N,N'-m-phenylenebismaleimide, dipropargyl terephthalate, diallyl phthalate, tetraallylterephthalamide, and triallyl phosphate. Among these, compounds having 3 or more curing functional groups are particularly preferred from the standpoint of the ease of crosslinking of the fluoropolymer.

The level of use of the polyfunctional unsaturated compound is about 0.05 to 10 parts by mass relative to 100 parts by mass as solids of said fluorocopolymer. The preferred lower limit is 0.5 parts by mass and the preferred upper limit is 5 parts by mass.

To promote the reaction, an acid acceptor may be added in advance to the fluorocopolymer curable composition mentioned above. The acid acceptor includes, inter alia, metal oxides such as magnesium oxide, potassium oxide, silicon oxide, aluminum oxide, lead oxide, etc.; metal hydroxides such as magnesium hydroxide, calcium hydroxide, aluminum hydroxide, etc.; and synthetic hydrotalcite. The level of use of the acid acceptor is preferably 1 to 30 parts by mass relative to 100 parts by mass as solids of the fluorocopolymer.

Where necessary, the fluorocopolymer curable composition may be supplemented with a known catalyst which is used for reaction promoting purposes in various crosslinking systems and/or various additives such as filler, processing aid, oxidation inhibitor, aging inhibitor, ozone degradation inhibitor, and ultraviolet absorber.

The method of preparing and curing said fluorocopolymer curable composition is not particularly restricted but may be mixing by the known routine method. Since the fluorocopolymer is a low molecular weight substance, mixing with a planetary mixer or a table-top mixer is sufficient. In this procedure, the temperature may be increased to 50° C. or higher for promoting the reaction. Furthermore, the mixture of the fluorocopolymer and the crosslinking agent is preferably allowed to react at a temperature not below 50° C. for at least 3 hours.

The fluorocopolymer curable composition can be generally processed by injection molding or extrusion molding by means of an extrusion gun, such as a hot-melt gun, or a liquid injection molding system (LIMS) at a temperature not over 200° C., or by casting in molds at room temperature to 200° C.

Referring, further, to the method of curing said fluorocopolymer curable composition, other methods than the above can be used according to the kind of cure site on the fluorocopolymer used. In the case where said cure site is a hydrolysable silyl group, the composition may be caused to undergo self-crosslinking in the presence of moisture in the air. In the case where said cure site is an unsaturated group, the composition can be cured by irradiation with ultraviolet light in the presence of a photoinitiator and, where necessary, a sensitizer as well.

In the case where said cure site is an iodine and/or bromine atom, the composition can be cured by irradiation with ultraviolet light, and in the case where such UV curing is to be carried out, the fluorocopolymer curable composition preferably comprises a fluorocopolymer, a photoinitiator, and a polyfunctional unsaturated compound. The ultraviolet light is preferably one having a wavelength range of 420 nm to 150 nm but one whose wavelength range includes the maximum absorption wavelength of the photoinitiator used can be utilized. The UV irradiation time depends on the intensity of UV light and the formulating amount of the photoinitiator but may be about 10 seconds to 5 minutes at about 165 mV/cm².

In cases where UV crosslinking is preferred, said fluorocopolymer curable composition can be cured with an electron beam or a radiation beam and the crosslinking reaction may be carried out using an electron beam and/or a radiation beam in lieu of or in combination with ultraviolet light.

In the case where said cure site is an unsaturated group, said fluorocopolymer curable composition may be a composition comprising said fluorocopolymer, a (meth) acrylic monomer, and a photoinitiator and can be cured by UV crosslinking. The (meth) acrylic monomer may be whichever of a unifunctional one or a polyfunctional one. The (meth) acrylic monomer which can be used includes, inter alia, alkoxyalkylene glycol (meth)acrylates, alkylene glycol mono- or di(meth)acrylates, and polyol-alkylene oxide adduct mono- or poly(meth)acrylates. The photoinitiator mentioned above is not particularly restricted provided that it is decomposed by irradiation to generate a radical for initiating the polymerization reaction, and includes the compounds mentioned hereinbefore, among others. Where necessary, said photoinitiator can be used in combination with a sensitizer [cf. Japanese Kokai Publication 2001-81131].

The fluorocopolymer curable composition, in which said cure site is an unsaturated group, may comprise said fluorocopolymer, a (meth)acrylic monomer, and a radical generator, and those fluorocopolymer, (meth) acrylic monomer, and radical generator can be mixed by the routine method mentioned above to effect curing. The (meth)acrylic monomer mentioned just above includes the monomers mentioned hereinbefore. As the radical generator mentioned above, a two-main component package type acrylic adhesive can be used. The two-main component package type acrylic adhesive mentioned above is a system consisting of a first component comprising a polymerizable (meth)acrylic monomer and a radical-forming organic peroxide as main ingredients, and a second component composed predominantly of a polymerizable (meth)acrylic monomer and a reducing agent capable of forming a redox catalyst system with the organic peroxide contained in said first component (Japanese Kokai Publication 2001-81131).

The fluorocopolymer curable composition, in which said cure site is an unsaturated group, may be a composition comprising said fluorocopolymer, a compound having 2 or more Si—H groups within each molecule, a hydrosilylation reaction catalyst, and optionally a reaction inhibitor. The above fluorocopolymer curable composition may undergo a curing reaction based on hydrosilylation to form a three-dimensional network structure (Japanese Kokai Publication 2002-3653, Japanese Kokai Publication 2002-20615).

As the above-mentioned compound having 2 or more Si—H groups within each molecule, a compound represented by the general formula $R^{11}{}_b H_c SiO_{(4-b-c)/2}$ can be generally employed. In the above general formula, $R^{11}$ represents a substituted or unsubstituted univalent hydrocarbon group of 1 to 10 carbon atoms, particularly 1 to 8 carbon atoms, exclusive of aliphatic unsaturation, and as examples of such univalent hydrocarbon group, there can be mentioned halogen-substituted alkyl groups, such as trifluoropropyl, alkyl groups, and phenyl group. The preferred, among these, are methyl, ethyl, propyl, phenyl, and trifluoropropyl, with methyl and phenyl being particularly preferred.

Referring, further, to the above general formula, b is $0 \leq b < 3$, preferably $0.6 < b < 2.2$, still more preferably $1.5 \leq b \leq 2$; c is $0 < C \leq 3$, preferably $0.002 \leq C < 2$, still more preferably $0.01 \leq C \leq 1$; and b+c is $0 < b+c \leq 3$, preferably $1.5 < b+c \leq 2.7$.

The above-mentioned compound having 2 or more Si—H groups in each molecule is an organohydrogenpolysiloxane containing preferably 2 to 1000 silicon atoms, more preferably 2 to 300 silicon atoms, still more preferably 4 to 200 silicon atoms, within each molecule. More particularly, the above compound includes, inter alia, siloxane oligomers such as oligomers of 1,1,3,3-tetramethyldisiloxane, 1,3,5,7-tetramethyltetrasiloxane, 1,3,5,7,8-pentamethylpentasiloxane, etc.; methylhydrogenpolysiloxane blocked with a trimethylsiloxy group at both ends, dimethylsiloxane/methylhydrogensiloxane copolymer blocked with a trimethylsiloxy group at both ends, methylhydrogenpolysiloxane blocked with a silanol group at both ends, dimethylsiloxane/methylhydrogensiloxane copolymer blocked with a silanol group at both ends, dimethylpolysiloxane blocked with a dimethylhydrogensiloxy group at both ends, methylhydrogenpolysiloxane blocked with a dimethylhydrogensiloxy group at both ends, dimethylsiloxane/methylhydrogensiloxane copolymer blocked with a dimethylhydrogensiloxy group at both ends, and silicone resins comprising the $R^{11}{}_2(H)SiO_{1/2}$ unit and $SiO_{4/2}$ unit, optionally further containing the $R^{11}{}_3SiO_{1/2}$ unit, $R^{11}{}_2SiO_{2/2}$ unit, $R^{11}(H) SiO_{2/2}$ unit, $(H)SiO_{3/2}$ unit, or $R^{11}SiO_{3/2}$ unit.

The methylhydrogenpolysiloxane blocked with a trimethylsiloxy group at both ends of a trunk chain includes, inter alia, compounds of the following general formula and compounds such that the methyl groups in the following general formula have been partly or totally replaced by ethyl, propyl, phenyl, or trifluoropropyl groups.

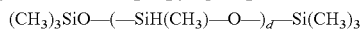

(wherein d represents an integer of not less than 2)

The dimethylsiloxane/methylhydrogensiloxane copolymer blocked with a trimethylsiloxy group at both ends of a trunk chain includes, inter alia, compounds of the following general formula and compounds such that the methyl groups in the following general formula have been partly or totally replaced by ethyl, propyl, phenyl, or trifluoropropyl groups.

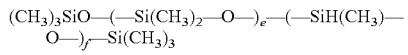

(wherein e represents an integer of not less than 1; f represents an integer of not less than 2)

The methylhydrogenpolysiloxane blocked with a silanol group at both ends of a trunk chain includes, inter alia, compounds of the following general formula and compounds such that the methyl groups in the following general formula have been partly or totally replaced by ethyl, propyl, phenyl or trifluoropropyl groups.

HOSi(CH$_3$)$_2$O—(—SiH(CH$_3$)—O—)$_2$—Si(CH$_3$)$_2$OH

The dimethylsiloxane/methylhydrogensiloxane copolymer blocked with a silanol group at both ends of a trunk chain includes, inter alia, compounds of the following general formula and compounds such that the methyl groups in the following general formula have been partly or totally replaced by ethyl, propyl, phenyl or trifluoropropyl groups.

HOSi(CH$_3$)$_2$O—(—Si(CH$_3$)$_2$—O—)$_e$—(—SiH(CH$_3$)—O—)$_f$—Si(CH$_3$)$_2$OH (wherein e represents an integer of not less than 1; f represents an integer of not less than 2)

The dimethylpolysiloxane blocked with a dimethylhydrogensiloxy group at both ends of a trunk chain includes, inter alia, compounds of the following general formula and compounds such that the methyl groups in the general formula have been partly or totally replaced by ethyl, propyl, phenyl or trifluoropropyl groups.

HSi(CH$_3$)$_2$O—(—Si(CH$_3$)$_2$—O—)$_e$—Si(CH$_3$)$_2$H (wherein e represents an integer of not less than 1)

The methylhydrogenpolysiloxane blocked with a dimethylhydrogensiloxy group at both ends of a trunk chain includes, inter alia, compounds of the following general formula and compounds such that the methyl groups in the general formula have been partly or totally replaced by ethyl, propyl, phenyl or trifluoropropyl groups.

HSi(CH$_3$)$_2$O—(—Si(CH$_3$)—O—)$_e$—Si(CH$_3$)$_2$H (wherein e represents an integer of not less than 1)

The dimethylsiloxane/methylhydrogensiloxane copolymer blocked with a dimethylhydrogensiloxy group at both ends of a trunk chain includes, inter alia, compounds of the following general formula and compounds such that the methyl groups in the general formula have been partly or totally replaced by ethyl, propyl, phenyl or trifluoropropyl groups.

HSi(CH$_3$)$_2$O—(—Si(CH$_3$)$_2$—O—)$_e$—(—SiH(CH$_3$)—O—)$_h$—Si(CH$_3$)$_2$H (wherein e and h each represents an integer of not less than 1)

These compounds can be produced by the known technology. For example, such a compound can be easily obtained by causing octamethylcyclotetrasiloxane and/or tetramethylcyclotetrasiloxane and a compound containing triorganosilyl or diorganohydrogensiloxy groups which may become end groups to attain equilibrium in the presence of a catalyst such as sulfuric acid, trifluoromethanesulfonic acid, methanesulfonic acid or the like at a temperature of about −10° C. to 40° C. The above-mentioned compound containing triorganosilyl groups may for example be hexamethyldisiloxane and said compound containing diorganohydrogensiloxy groups may for example be 1,3-dihydro-1,1,3,3-tetramethyldisiloxane.

Referring to the above-mentioned compound having 2 or more Si—H groups within each molecule, consideration of the compatibility with the fluorocopolymer, dispersibility, and post-cure homogeneity favors the use of a compound having at least one univalent perfluorooxyalkyl group, univalent perfluoroalkyl group, bivalent perfluorooxyalkylene group, or bivalent perfluoroalkylene group and not less than 2, preferably 3 or more, Si—H groups within the molecule. As the above perfluorooxyalkyl group, perfluoroalkyl group, perfluorooxyalkylene group and perfluoroalkylene group, the groups represented by the following general formulas can be particularly mentioned.

<Univalent Perfluoroalkyl Group>

C$_k$F$_{2k+1}$—

(wherein k represents an integer of 1 to 20, preferably 2 to 10)

<Bivalent Perfluoroalkylene Group>

—C$_k$F$_{2k}$—

(wherein k represents an integer of 1 to 20, preferably 2 to 10)

<Univalent Perfluorooxyalkyl Group>

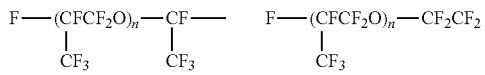

(wherein n represents an integer of 1 to 5)

<Bivalent Perfluorooxyalkylene Group>

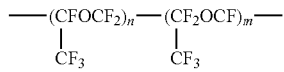

(wherein m represents an integer of 1 to 50; n represents an integer of 1 to 50; m+n satisfies 2 to 100)

—(CF$_2$O)$_m$—(CF$_2$CF$_2$O)$_n$—CF$_2$—

(wherein m and n each represents an integer of 1 to 50)

The bivalent linkage group linking said perfluoroalkyl group, perfluorooxyalkyl group, perfluoroalkylene group, or perfluorooxyalkylene group with the silicon atom includes an alkylene group, an arylene group, and an alkylene-arylene combination group, which may optionally be interrupted by an ether-forming oxygen atom, an amido bond, a carbonyl bond, or the like and has 2-12 carbon atoms, such as —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)—CO— (where Ph represents a phenyl group), —CH$_2$CH$_2$CH$_2$—N(CH$_3$)—CO—, and —CH$_2$CH$_2$CH$_2$—O—CO—.

The univalent substituent group attached to the silicon atom other than the univalent organic group containing a univalent or bivalent fluorine-containing substituent group, namely perfluoroalkyl group, perfluorooxyalkyl group, perfluoroalkylene group or perfluorooxyalkylene group, in said compound having 2 or more Si—H groups within each molecule includes, inter alia, alkyl groups such as methyl, ethyl, propyl, butyl, hexyl, cyclohexyl, octyl, decyl, etc.; alkenyl groups such as vinyl, allyl, etc.; aryl groups such as phenyl, tolyl, naphthyl, etc.; aralkyl groups such as benzyl, phenylethyl, etc.; and unsubstituted or substituted hydrocarbon groups having 1 to 20 carbon atoms which are available as the hydrogen atoms of the above-mentioned various groups are substituted, at least in part, by chlorine or cyano, for instance, such as chloromethyl, chloropropyl, cyanoethyl and so forth.

The above-mentioned compound having 2 or more Si—H groups within each molecule may be one having a cyclic structure, a linear structure, a three-dimensional network, or a combination thereof. The number of silicon atoms in said compound having 2 or more Si—H groups within each molecule is not particularly restricted but is usually 2 to 60, preferably 3 to 60, more preferably 3 to 30.

The compound having 2 or more Si—H groups within each molecule includes, inter alia, the following compounds. In the following formula, Me represents a methyl group and Ph represents a phenyl group. These compounds can be used each independently or in a combination of 2 or more species.
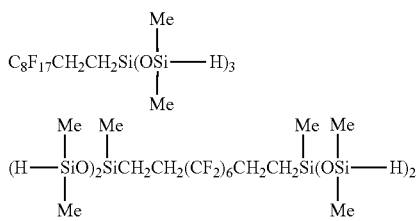
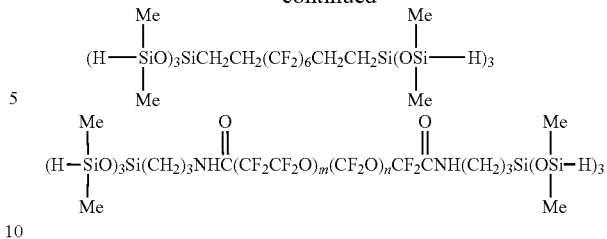
(wherein m represents an integer of 1 to 20 and an average of 10; n represents an integer of 1 to 10 and an average of 6)
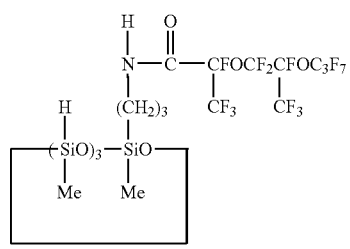
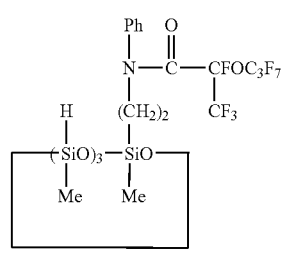
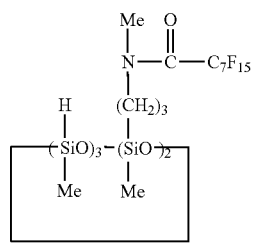
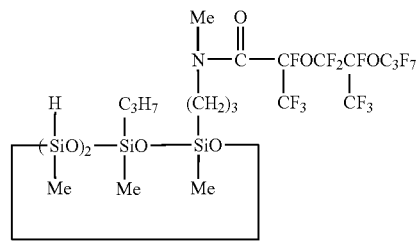
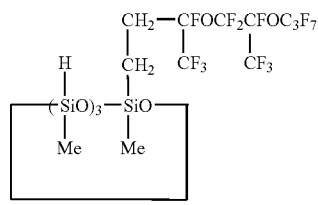
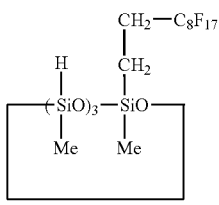
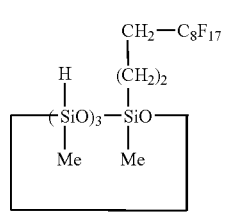
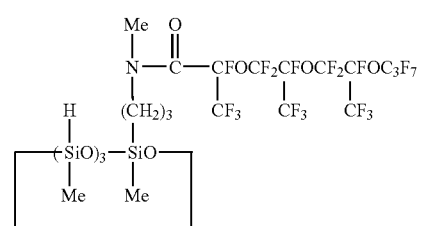
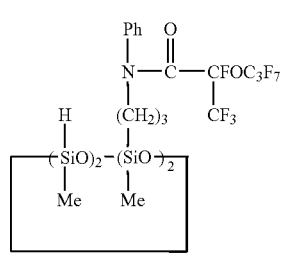
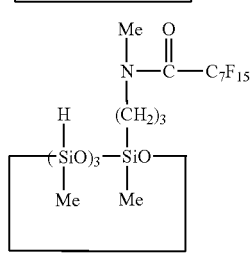

-continued

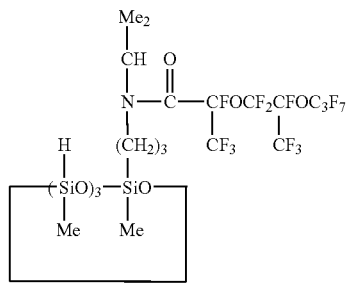

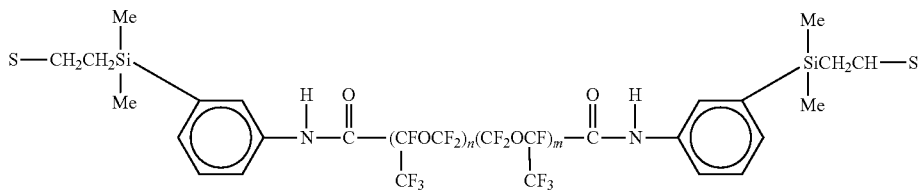

(wherein S represents

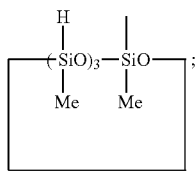

n represents an integer of 1 to 30; m represents an integer of 1 to 30; n+m satisfies 2 to 60 and an average of 2 to 50)

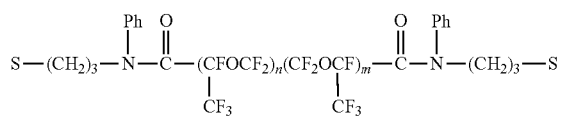

(wherein S represents

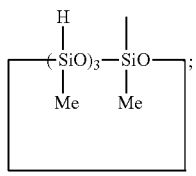

n represents an integer of 1 to 30; m represents an integer of 1 to 30; n+m satisfies 2 to 60 and an average of 2 to 50)

(wherein n represents an integer of 2 to 60 and an average of 3 to 50)

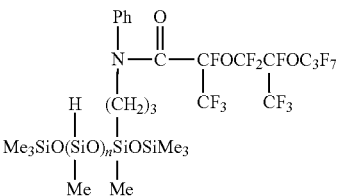

(wherein n represents an integer of 2 to 60 and an average of 3 to 50)

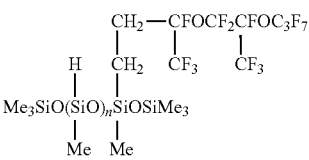

(wherein n represents an integer of 2 to 60 and an average of 3 to 50)

The hydrosilylation reaction catalyst mentioned above is not particularly restricted provided that it promotes the addition reaction (alkene hydrosilylation reaction) between said fluorocopolymer and said compound having 2 or more Si—H groups within each molecule but includes platinum group

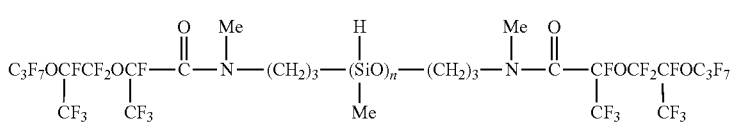

addition reaction catalysts (Group 8 metal catalysts, namely the metals, complexes, and compounds of metals of Group 8 of Periodic Table of the Elements), such as platinum series catalysts, palladium series catalysts, rhodium series catalysts, and so forth. Among these, platinum series catalysts are preferred in view of their comparatively ready availability.

The platinum series catalysts may be the well-known catalysts usually employed for curing reactions of the addition curing type, thus including, inter alia, the finely divided powdery metallic platinum catalyst described in U.S. Pat. No. 2,970,150, the chloroplatinic acid catalyst described in U.S. Pat. No. 2,823,218, the platinum-hydrocarbon complex compounds described in U.S. Pat. Nos. 3,159,601 and 1,596,62, the chloroplatinic acid-olefin complex compounds described in U.S. Pat. No. 3,516,946, and the platinum-vinylsiloxane complex compounds described in U.S. Pat. Nos. 3,775,452 and 3,814,780. More specifically, elemental platinum (platinum black), chloroplatinic acid, complexes of chloroplatinic acid with olefins such as ethylene; complexes of chloroplatinic acid with alcohols or vinylsiloxanes, and platinum as supported on carriers such as silica, alumina, and carbon can be mentioned.

The palladium series catalyst mentioned above includes palladium, palladium compounds, chloropalladic acid, etc. and said rhodium series catalyst includes rhodium, rhodium compounds, and chlorrhodic acid. For example, RhCl(PPh$_3$)$_3$, RhCl(CO)(PPh$_3$)$_2$, RhCl(C$_2$H$_4$)$_2$, Ru$_3$(CO)$_{12}$, IrCl(CO) (PPh$_3$)$_2$, Pd(PPh$_3$)$_4$ (Ph represents a phenyl group) can be mentioned.

As the hydrosilylation catalyst mentioned above, Lewis acids and cobalt carbonyl compounds may also be used.

The reaction suppressant which are optionally used as mentioned above includes, inter alia, benzotriazole; acrylonitrile; amide compounds such as N,N-diallylacetamide, N,N-diallylbenzamide, N,N,N',N'-tetraallyl-o-phthalic diamide, N,N,N',N'-tetraallyl-m-phthalic diamide, N,N,N',N'-tetraallyl-p-phthalic diamide, etc.; sulfur; phosphorus; nitrogen; amine compounds; sulfur compounds, phosphorus compounds; tin; tin compounds; tetramethyltetravinylcyclotetrasiloxane; and organic peroxides such as hydroperoxides.

The reaction suppressant mentioned above includes, inter alia, acetylenic alcohols such as 1-ethynyl-1-hydroxycyclohexane, 3-methyl-1-butyn-3-ol, 3,5-dimethyl-1-hexyn-3-ol, phenylbutynol, etc., and compounds such as the compounds described as formulating substance (4) in U.S. Pat. No. 3,445,420, the acetylenic compounds described as ingredient (d) in Japanese Kokai Publication Sho-54-3774.

The above-mentioned fluorocopolymer curable composition in which said cure site is a carboxyl group may be a composition comprising said fluorocopolymer and a compound having 2 or more epoxy structures, in which case the curing reaction attributable to the epoxy structures can be induced. The above compound having 2 or more epoxy structures is not particularly restricted but includes, inter alia, butadiene dioxide, diglycidyl ether; polyglycidyl ethers of polyols, e.g. erythritol, and glycerol; polyhydric phenol glycidyl ethers; Epon™ resins having 2 or more epoxy structures; bisphenol F glycidyl ether; pyromellitic anhydride; dicyclopentadiene diepoxide; tetramethyl-bis(3-hydroxypropyl)disiloxane diglycidyl ether and other compounds described in U.S. Pat. No. 3,147,314.

The fluorocopolymer curable composition in which said cure site is an isocyanato group may be one comprising said fluorocopolymer and a compound having 2 or more functional groups reactive to isocyanato groups, in which case the curing reaction attributable to the isocyanato groups can be induced. The above functional groups reactive to isocyanato groups may for example be amino groups and/or hydroxyl groups.

In the case where the above fluorocopolymer curable composition is subjected to UV crosslinking, reaction due to the polyisocyanate, and/or curing reaction associated with the epoxy compound, the curing reaction can be conducted at room temperature and, therefore, such a composition is especially useful in the case of on-site molding or a molded article having a complicated profile is to be produced. Molding by the curing reaction at room temperature can be easily achieved by means of, for example, a hot-melt gun or an extrusion gun such as a dispenser.

The fluorocopolymer curable composition mentioned above may be whichever of the one-component type or the two-component type and, in the case where curing at room temperature is feasible, a two-component system is preferred.

The above fluorocopolymer curable composition may be one supplemented with a polymer or oil other than the fluorocopolymer for adjusting the viscosity of the fluorocopolymer curable composition or depressing the glass transition point of the cured article obtainable from the composition. The above-mentioned polymer or oil other than the fluorocopolymer is not particularly restricted but, as preferred examples, there can be mentioned polymers and oils having a perfluoropolyether structure in the trunk chain, silicone rubber, silicone oil, and fluorosilicone rubber.

In the sense that the mechanical characteristics of the end-product cured article may be improved, the polymers and oils other than said fluorocopolymer are preferably polymers and oils having cure sites capable of taking part in the curing reaction of said curable fluorocopolymer reaction. Moreover, in the sense that the viscosity of the fluorocopolymer curable composition may be depressed, said polymers and oils are preferably polymers and oils having lower viscosity than said fluorocopolymer. In the sense that the glass transition point of the cured article to be obtained may be depressed, said polymers and oils other than the fluorocopolymer are preferably those having glass transition points lower than the glass transition point of said fluorocopolymer. In terms of compatibility with said fluorocopolymer, said polymers and oils other than the fluorocopolymer are preferably polymers and oils having a perfluoropolyether structure in the trunk chain.

The cured article obtained from said fluorocopolymer curable composition (A) is also a further aspect of the present invention.

The cured article (hereinafter referred to sometimes as "high-crosslinking cured article") obtained from the fluorocopolymer curable composition (B) comprising a fluorocopolymer, said fluorocopolymer being obtainable from TFE and a perfluoro(alkylvinylether) of the following general formula (II):

$$CF_2=CF-O-R_f^1 \quad (II)$$

(wherein $R_f^1$ represents a perfluoroalkyl group of 1 to 20 carbon atoms optionally having 4 or less of oxygen atoms) is also a still another aspect of the present invention.

The above-mentioned high-crosslinking cured article has the ratio (a/b) of its mass (a) after immersion in a perfluoro (2-n-butyltetrahydrofuran) solvent to its mass (b) before said immersion being not less than 0.95. If said ratio is less than 0.95, the crosslinking will proceed only insufficiently depending on uses. The above ratio (a/b) of said high-crosslinking cured article is preferably not less than 0.97, more preferably not less than 0.98, still more preferably not less than 0.99. In this specification, said ratio (a/b) is sometimes referred to gel fraction. When the gel fraction is 1, theoretically the cured article contains no uncrosslinked fluorocopolymer, that is to say the copolymer has been sufficiently crosslinked, but for all practical purposes, the gel fraction of said high-crosslinking cured article may for example be not more than 0.997 provided that it is within the above range.

The above-mentioned perfluoro(2-n-butyltetrahydrofuran) solvent is a solvent composed predominantly of perfluoro(2-n-butyltetrahydrofuran). As used in this specification, the term "solvent composed predominantly of perfluoro(2-n-butyltetrahydrofuran" means a solvent containing not less than 95% by volume of perfluoro(2-n-butyltetrahydrofuran).

The conventional liquid rubber is of low molecular weight and, therefore, the proportion of the crosslinked polymer molecules in the cured article is low so that the gel fraction of the cured article is less than 0.95. However, the high-crosslinking cured article of the present invention may have a high gel fraction within the above-mentioned range even though the fluorocopolymer used in the fluorocopolymer curable composition (B) is of low molecular weight. The reason why the high-crosslinking cured article of the present invention has a gel fraction within the above range is not clear but it is supposed that because the number of molecules not having a crosslinking site is very small in the fluorocopolymer, the curing reaction takes place with good efficiency.

The cured article of the present invention finds application as various shaped articles in the following fields.

In the semiconductor-related field inclusive of semiconductor production equipment, liquid crystal panel production equipment, plasma panel production equipment, plasma-address liquid crystal panels, field emission display panels, and solar cell substrate boards, there can be mentioned O(angular)-rings, packings, sealants, tubes, rolls, coatings, linings, gaskets, diaphragms, hoses, etc., and these articles can be used in the CVD equipment, dry-etching equipment, wet-etching equipment, oxidation diffuser equipment, sputtering equipment, ashing equipment, cleaning equipment, ion implantation equipment, exhausting equipment, chemical solution lines, and gas lines. More particularly, the application includes gate valve O-rings and sealing members, quartz window O-rings and seals, chamber O-rings and seals, gate O-rings and seals, belljar O-rings and seals, coupling O-rings and seals, pump O-rings, seals, and diaphragms, semiconductor gas controller O-rings and seals, resist developer and stripper O-rings and seals, wafer cleaning hoses and tubes, wafer carrier rolls, resist developer chamber/stripper chamber linings or coatings, wafer cleaning tank linings and coatings, and wet-etching tank linings and coatings. Furthermore, sealing members and sealants, optical fiber quartz coverings, electronic parts for insulation, damping, water-proofing or moisture-proofing purposes, circuit board potting, coating, or adhesive seal materials, magnetic memory gaskets, modifying agents for epoxy and other sealants, and clean room/clean equipment sealants, etc. can also be mentioned as further applications.

In the automotive field, the application includes gaskets, shaft seals, valve system seals, sealants and hoses can be used for the engine and peripheral equipment and hoses and sealing members can be used in AT equipment, O(angular)-rings, tubes, packings, valve cores, hoses, sealing members, and diaphragms can be used in the fuel system and peripheral equipment. More particularly, the application includes engine head gaskets, metal gaskets, oil pan gaskets, crankshaft seals, camshaft seals, valve system seals, manifold packings, oil hoses, oxygen sensor seals, ATF hoses, injector O-rings, injector packings, fuel pump O-rings, diaphragms, fuel hoses, crankshaft seals, gearbox seals, power piston packings, cylinder liner seals, valve system seals, automatic speed change front pump seals, rear axle pinion seals, universal joint gaskets, speedometer pinion seals, foot-brake piston cups, torque transmission O-rings, oil seals, exhaust gas recombustor seals, bearing seals, EGR tubes, twin-cable tubes, carburetor sensor diaphragms, damping rubbers (engine mount, exhaust system, etc.), recombustor hoses, oxygen sensor bushes, and so forth.

In the aircraft field, rocket field, and ship field, there can be mentioned diaphragms, O(angular)-rings, valves, tubes, packings, hoses, and sealing members, and these can be used in fuel systems. More particularly, in the aircraft field, jet engine valve stem seals, fuel supply hoses, gaskets and O-rings, rotating shaft seals, hydraulic system gaskets, fire barrier seals, etc. can be mentioned. In the ship field, screw propeller shaft stern seals, diesel engine suction-exhaust valve stem seals, butterfly valve seals, butterfly valve shaft seals, etc. can be mentioned.

In the plant and other chemical field, the application includes linings, valves, packings, rolls, hoses, diaphragms, O(angular)-rings, tubes, sealing members, chemical-resistant coatings, etc. and these can be used in the processes for production of pharmaceutical products, agrochemicals, paints, resins and other chemical products. More particularly, chemical pump, flowmeter and piping seals, heat exchanger seals, glass cooler packings for sulfuric acid production equipment, agrochemical sprayer/agrochemical delivery pump seals, gas piping seals, plating bath seals, high-temperature vacuum dryer packings, papermaking belt roller seals, fuel cell seals, wind tunnel joint seals, trichloroethylene-resistant rolls (for textile dyeing), acid-resistant hoses (for concentrated sulfuric acid), gas chromatograph, and pH meter tube joint packings, chlorine gas transport hoses, rainwater drain hoses for benzene/toluene storage tanks, seals, tubes, diaphragms and valve parts for analytical instruments and physicochemical devices, etc. can be mentioned as examples.

In the pharmaceutical field, vial plugs and the like can be mentioned as examples.

In the field of photography such as developing machines, the printing field such as printing machines, and the paint field such as coating equipment, the cured article includes various rolls and these can be used as photographic film developer/X-ray film developer rolls, printing rolls, and coating rolls, respectively. More particularly, developer rolls for photographic film/X-ray film developing machines, printing rolls such as gravure rolls and guide rolls, coating rolls such as gravure rolls for magnetic tape coating lines, guide rolls for magnetic tape coating lines, and various other coating rolls can be mentioned. Among further applications are dry copier seals, printing rolls, scrapers, tubes, and valve components for printing equipment, coating rolls, scrapers, tubes, and valve components for coating equipment, ink tubes, rolls and belts for printers, dry copier belts and rolls, and printing machine rolls and belts.

Moreover, the tubes can be used in the field of analytical and physical/chemical instruments.

In the field of food plant facilities, the application includes linings, valves, packings, rolls, hoses, diaphragms, O(angular)-rings, tubes, sealing members, belts, etc. and these can be used in food production processes. Specifically, plate heat exchanger seals, automatic vending machine solenoid valve seals, etc. can be mentioned.

In the field of atomic power plant machinery, packings, O-rings, hoses, sealing members, diaphragms, valves, rolls, and tubes can be mentioned.

In the field of iron and steel industry such as steel sheet processing line equipment, rolls can be mentioned, and these can be used as sheet processing rolls.

In the general industrial field, the application includes packings, O-rings, hoses, sealing members, diaphragms, valves, rolls, tubes, linings, mandrels, electric wires, flexible joints, belts, rubber boards, weather strips, PPC copying machine rolls, roll blades, belts, and so forth. More particularly, hydraulic and lubricating machine seals, bearing seals, dry cleaner sight-hole and other seals, uranium hexafluoride concentration equipment seals, cyclotron seal (vacuum) valves, automatic packing machine seals, diaphragms for the pump used for the analysis for sulfur dioxide gas and chlorine gas in the air (pollution analyzers), printing machine rolls and belts, and pickling squeeze-rolls, etc. can be mentioned.

In the electrical field, specific examples are insulating oil caps, liquid-seal transformer venting seals, oil well cable jackets, etc.

In the field of fuel cells, specific examples are electrode-separator sealing members and hydrogen, oxygen, and product water line seals.

In the field of electronic components and parts, such specific uses as heat-dissipating materials, electromagnetic shield materials, modifiers for epoxy or other printed board prepreg resins, electric bulb and other anti-scattering materials, computer hard disk drive gaskets and so forth can be mentioned.

The application suited for on-site molding is not particularly restricted but includes, inter alia, automotive engine metal gasket coatings, engine oil pan gaskets, copier/printer rolls, architectural sealants, magnetic recorder gaskets, cleanroom filter unit sealants, printed circuit board coatings, electric/electronic parts locking agents, insulation/moisture-proofing materials for electric appliance lead terminals, electric furnace and other oven seals, seathed heater terminal treating agents, electronic range window seals, CRT wedge and neck bonds, automotive electrical system component bonds, kitchen, bathroom, and washroom joint seals, and so forth.

The above composition comprising said fluorocopolymer can be used with particular advantage in applications exploiting its cleanliness, such as magnetic recorder (hard disk drive) gaskets and clean equipment sealants such as seals for semiconductor production equipment and wafer and other device stores.

The above fluorocopolymer composition can also be used with particular advantage in applications exploiting its chemical resistance, low gas permeability, flame retardation and other characteristics, such as fuel cell sealants inclusive of packings between electrodes and peripheral pipelines of fuel cells.

BEST MODES FOR CARRYING OUT THE PRESENT INVENTION

The following examples are intended to describe the present invention in further detail and should by no means be construed as defining the scope of the present invention.

EXAMPLE 1

A stainless steel autoclave of 500 cc capacity without an ignition source was charged with 250 ml of pure water, 2.5 g of $CF_3CF_2CF_2OCF(CF_3)CF_2OCF(CF_3)COONH_4$, and, as a pH control agent, 0.023 g of disodium hydrogenphosphate and the oxygen was removed by nitrogen purging.

Then, under stirring at 600 rpm, the temperature was raised to 80° C. and a TFE/PMVE mixture gas of TFE:PMVE=25:75 (mol:mol) was admitted under pressure to an internal pressure of 0.2 MPa·G. Then, 0.083 g of the initiator ammonium persulfate [APS] was dissolved in 5 ml of water and the solution was introduced into the autoclave to initiate the polymerization reaction. The internal pressure fell with the progress of polymerization so that at the time-point when it had dropped to 0.18 MPa·G, a TFE/PMVE mixture gas of TFE:PMVE=60:40 (mol:mol) was introduced to cause the internal pressure to return to 0.22 MPa·G. This procedure was repeated, and every 3 hours from the start of polymerization, the autoclave was further charged with 5 ml of the aqueous APS solution of the same concentration as the initial charge to continue the polymerization. This procedure was repeated until 12 hours, at the end of which time the autoclave was cooled and the monomer gas was exhausted out to recover 298 g of an emulsion. The polymer concentration of this emulsion was 1.6%.

The above emulsion, 40 g, was dropped into 100 g of 7% hydrochloric acid for coagulation, then 40 g of 1,1-dichloro-1-fluoroethane (flon R141b) was further added, and the mixture was stirred for 5 minutes. At this stage, the mixture separated into 3 layers, namely a water layer, an R141b layer, and a polymer layer. The polymer layer was separated and dried to give 0.53 g of a fluorocopolymer which was syrupy at room temperature.

$^{19}$F-NMR analysis revealed that the monomer composition of this fluorocopolymer was TFE:PMVE=59.9:40.1 (mol %).

(FT-IR Measurement)

Infrared spectrometric analysis under the following conditions yielded the infrared absorption spectrum presented in FIG. 1.

Instrument: Perkin-Elmer's FT-IR spectrometer model 1760X

Sample: a ca 0.1 mm-thick film

Measuring conditions: resolution 2 cm$^{-1}$, measurement interval 1 cm$^{-1}$, transmittance method In the infrared absorption spectrum shown in FIG. 1, the very large characteristic absorption due to the carbonyl group of the carboxyl group was found around 1774.5 cm$^{-1}$ and the characteristic absorption due to the C—F group was found around 2364.59 cm$^{-1}$.

EXAMPLE 2

Except that 0.392 g of potassium persulfate [KPS] in lieu of APS as the initiator was dissolved in 10 ml of water and added and that the polymerization initial pressure was set to 0.4 MPa·G, the polymerization pressure to 0.38 to 0.42 MPa·G, and the polymerization time to 6 hours, the procedure of Example 1 was otherwise faithfully followed to carry out the polymerization.

At 3 hours after the start of polymerization, the total pressure drop due to polymerization was 0.37 MPa. After 6 hours of polymerization, the total pressure drop was 0.52 MPa, and 309.9 g of an emulsion having a solids concentration of 2.8 mass % was obtained. The pH of the emulsion was measured with pH meter MP220 (™, Mettler Toledo).

EXAMPLE 3

Except that 8 g of 1N-KOH was added at 3 hours after the start of polymerization, the polymerization reaction was carried out in otherwise the same manner as in Example 2 and the pH was measured. At 3 hours after the start of polymerization and before the addition of KOH, the total pressure drop due to polymerization was 0.35 MPa, and the pH of the emulsion was 2.73. At 6 hours after the start of polymerization, the total pressure drop was 0.86 MPa, and 303.8 g of an emulsion having a solids concentration of 3.7 mass % was obtained. The pH of this emulsion was 3.77. Then, the coagulation, separation and drying were carried out in the same manner as in Example 1 to obtain 0.83 g of a fluorocopolymer which was syrupy at room temperature.

From the results obtained in Example 2 and Example 3, it was found that compared with Example 2 in which KPS was supplementally added 3 hours after the start of polymerization and KOH was not added, Example 3 in which KPS was supplementally added and KOH was also added 3 hours after the start of polymerization entailed a greater elevation in pH of the emulsion and a greater increase in polymerization rate.

In the following examples, the measurement of viscosity with a type E viscometer and the determination of number average molecular weight were carried out as follows.

(Protocol for Measurement of Viscosity with a Type E Viscometer)

The viscosity measurement was carried out with the viscometer VC-20 (™, manufactured by HAAKE) equipped with die PK20/4° (™, HAAKE) which is a die for type E viscosity measurement. The shear rate for use in a measurement with the above type E viscometer is varied according to the viscosity of the fluorocopolymer. The shear rate for said measurement is 50 s$^{-1}$ in the case where the viscosity of the fluorocopolymer is 0.1 to 200 Pa·s; 10 s$^{-1}$ in the case where the viscosity is higher than 200 Pa·s but not over 500 Pa·s; 1 s$^{-1}$ when the viscosity is higher than 500 Pa·s but not over 1000 Pa·s; 0.1 s$^{-1}$ when the viscosity is higher than 1000 Pa·s but not over 2000 Pa·s.

Actually, the viscosity of the fluorocopolymer was measured using any one of said shear rates and when a positive correlation was obtained between the viscosity so found and the shear rate used, the viscosity found was regarded as the viscosity of the fluorocopolymer. When no correspondence was obtained between the viscosity found and the shear rate defined above, a viscosity measurement was performed again using a different one of said shear rates and the value found to satisfy the above correspondence between viscosity and shear rate was regarded as the viscosity of the copolymer.

(Protocol for Determination of the Number Average Molecular Weight of a Fluorocopolymer Having a Carboxyl Group at its End)

The fluorocopolymer was sandwiched between two KBr tablets with smooth surfaces and with the thickness of the fluorocopolymer being made uniform, infrared spectrometry [IR] was carried out. The peak derived from the carbonyl group [C=O] of the carboxyl group [—C(=O)OH] appeared around 1774 cm$^{-1}$ and, therefore, the absorbance A of the peak was measured and the carboxyl group concentration c (mol/L) was calculated by means of the following equation.

$$C=A/(\epsilon/W)$$

ε: mol extinction coefficient of terminal carboxyl groups (L·cm$^{-1}$·mol$^{-1}$)
W: thickness of the fluorocopolymer (cm)

Using the carboxyl group concentration c(mol/L) calculated by means of the above equation, the number average molecular weight Mn$^1$ of the fluorocopolymer having a carboxyl group at its end was calculated by means of the following equation.

$$Mn^1=(d/c)\times 2$$

where
d: density of the fluorocopolymer (g/L)

(Protocol for Determination of the Number Average Molecular Weight of a Fluorocopolymer Having a Methoxycarbonyl Group at its End)

The fluorocopolymer was dissolved in a solvent and toluene was added as the reference standard. Then, the methoxycarbonyl group concentration (mol/g) was measured by $^1$H-NMR. The number average molecular weight Mn$^2$ of the fluorocopolymer having a methoxycarbonyl group at its end was then calculated by means of the following equation.

$$Mn^2=[1/(\text{methoxycarbonyl group concentration of the fluorocopolymer})]\times 2$$

EXAMPLE 4

A stainless steel autoclave having a polytetrafluoroethylene [PTFE] inner housing of 3 L capacity equipped with a rotary stirring blade and without an ignition source was charged with 1643 ml of pure water, 16.43 g of CF$_3$CF$_2$CF$_2$CCF(CF$_3$)CF$_2$OCF(CF$_3$)COONH$_4$, and 0.149 g of the pH control agent disodium hydrogenphosphate.12H$_2$O and the oxygen was driven out by nitrogen purging.

Then, under stirring at 1116 rpm, the temperature was raised to 80° C., and a TFE-PMVE mixture gas of tetrafluoroethylene [TFE]:perfluoro(methyl vinyl ether) [PMVE]=25:75 (mol:mol) was pressure-fed until an internal pressure of 0.4 MPa·G was established. As the initiator, 3.86 g of potassium persulfate [KPS] was dissolved in 60 ml of water and using a SUS vessel, the autoclave was charged with the initiator solution to start the polymerization reaction. As the internal pressure dropped with the progress of polymerization, a TFE-PMVE mixture gas of TFE:PMVE=60:40 (mol:mol) was fed at the point of time when the pressure had dropped to 0.35 MPa·G to reinstate the internal pressure to 0.4 MPa·G. This procedure was repeated. The stirring speed was changed to 800 rpm at 60 minutes after the start of polymerization and to 500 rpm at 150 minutes. Every 3 hours after the start of polymerization, the same amount of potassium persulfate [KPS] solution as the initial charge and 39.4 g of 2N-KOH were fed to the autoclave to continue the polymerization. This procedure was repeated and, as a result, the total pressure loss after 35.5 hours was 4.68 MPa. The autoclave was cooled and the monomer gas was exhausted to recover 2142 g of an emulsion with a small amount of precipitated polymer. The pH of the emulsion was 4.14.

Figure 2:
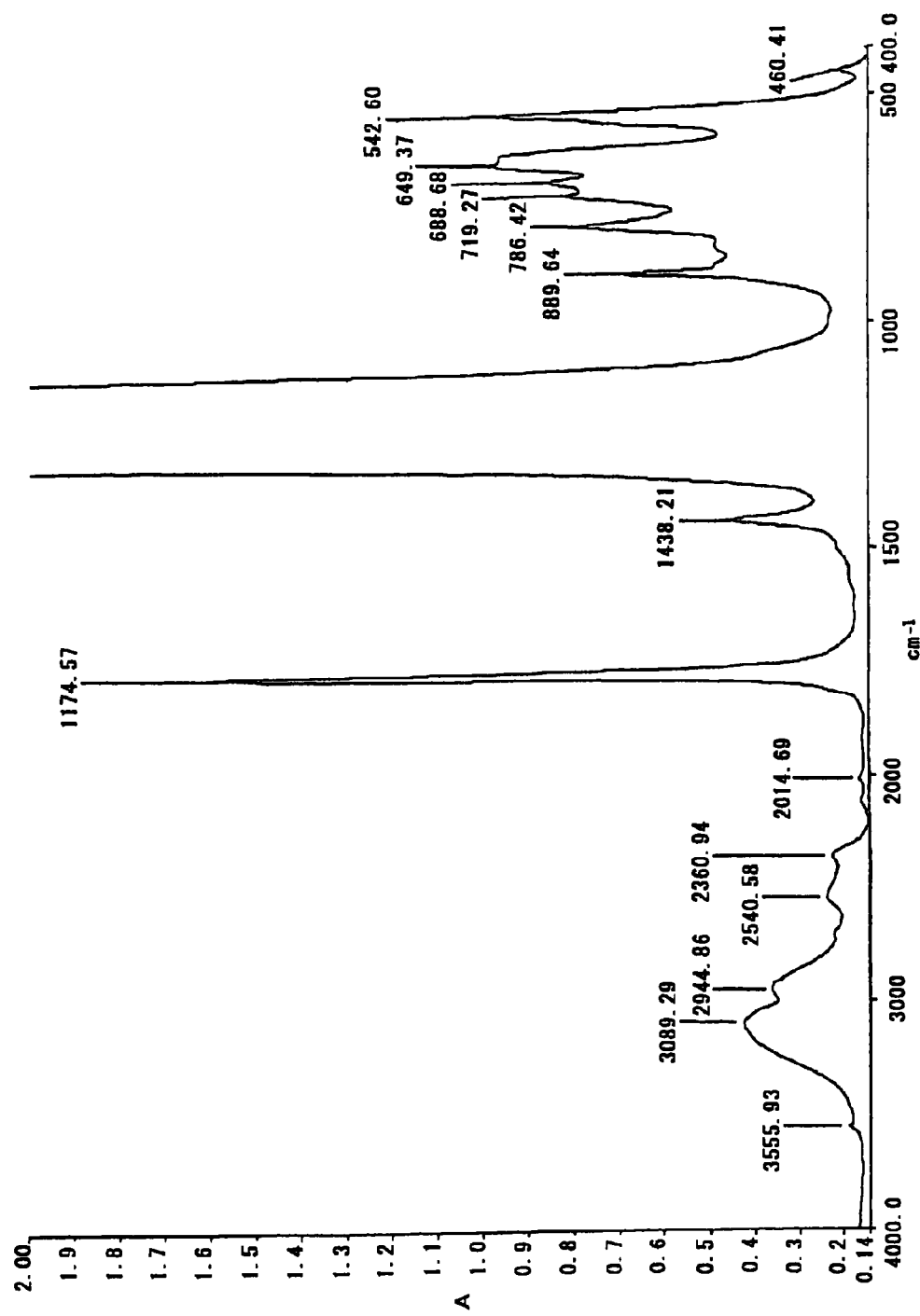
FIG. 2 is an infrared absorption spectrum obtained by the infrared spectrometric analysis in Example 4.

The above emulsion with precipitated polymer was dropped into 5 volumes of 7 mass % hydrochloric acid for complete coagulation. The polymer layer was separated and dried in vacuo at 120° C. for 70 hours to recover 178.9 g of a fluorocopolymer which was syrupy at room temperature. The fluorocopolymer thus obtained was washed with 7 mass % hydrochloric acid and dried in vacuo at 120° C. for 48 hours to remove the hydrochloric acid and water. IR spectrometry revealed that the resulting fluorocopolymer was one having a carboxyl group at its trunk chain end. The monomer ratio (by mol) of this fluorocopolymer as determined by $^{19}$F-NMR was TFE:PMVE=53.7:46.3. The product fluorocopolymer had a number average molecular weight of 5300 as determined by IR analysis [ε: 525 (L·cm$^{-1}$·mol$^{-1}$)] and a viscosity of 663 Pa·s as measured with a type E viscometer at a shear rate of 1 s$^{-1}$ and a temperature of 50° C. The IR chart is presented in FIG. 2.

IR spectrum: 1774 cm$^{-1}$ (C=O)

EXAMPLE 5

Except that the stirring speed was changed to 600 rpm at 100 minutes after the start of polymerization and to 550 rpm at 300 minutes and the polymerization time was set to 24 hours, the polymerization procedure of example 4 was otherwise faithfully followed to obtain 1973 g of an emulsion. The total pressure drop at 3 hours after the start of polymerization was 1.20 MPa and the total pressure drop at 24 hours was 6.68 MPa.

The emulsion obtained was then subjected to coagulation, separation and drying in the same manner as in Example 4 to recover 267 g of a fluorocopolymer which was syrupy at room temperature. The fluorocopolymer thus obtained was one having a carboxyl group at its trunk chain end. The monomer ratio (by mol) of the fluorocopolymer as determined by $^{19}$F-NMR analysis was TFE: PMVE=59.5:40.5 and the number average molecular weight of the copolymer as determined by IR analysis was 7500 [ε: 525 (L·cm$^{-1}$·mol$^{-1}$)].

IR spectrum: 1774 cm$^{-1}$ (C=O)

EXAMPLE 6

Except that the stirring speed was changed to 900 rpm at 215 minutes after the start of polymerization, to 800 rpm at 340 minutes, to 700 rpm at 380 minutes, and further to 650 rpm at 470 minutes and the polymerization time was set to 24 hours, the procedure of Example 4 was otherwise faithfully followed to obtain 2088 g of an emulsion. The total pressure drop at 3 hours after the start of polymerization was 1.16 MPa and the total pressure drop at 12 hours was 6.81 MPa.

The emulsion obtained was then coagulated, separated, and dried in the same manner as in Example 4 to recover 342 g of a fluorocopolymer which was syrupy at room temperature. This fluorocopolymer was one having a carboxyl group at its trunk chain end. The monomer ratio (by mol) of this fluorocopolymer as determined by $^{19}$F-NMR analysis was TFE:PMVE=59.7:40.3, the number average molecular weight of the copolymer as determined by IR analysis was 14000 [ε: 525 (L·cm$^{-1}$·mol$^{-1}$)], and the Mooney viscosity of the copolymer at 50° C. was 37.

IR spectrum: 1774 cm$^{-1}$ (C=O)

EXAMPLE 7

A stainless steel autoclave with a PTFE inner housing having a capacity of 3 L and equipped with a rotary stirring blade and free of an ignition source was charged with 1643 ml of pure water, 16.43 g of CF$_3$CF$_2$CF$_2$OCF(CF$_3$)CF$_2$OCF(CF$_3$)COONH$_4$, and 0.149 g of the pH control agent disodium hydrogenphosphate. 12H$_2$O and the oxygen was removed by nitrogen purging.

Then, under stirring at 1116 rpm, the temperature was raised to 80° C., and a TFE-PMVE mixture gas of TFE:PMVE=25:75 (mol:mol) was pressure-fed until an internal pressure of 0.4 MPa·G was established. As the initiator, 2.57 g of potassium persulfate [KPS] was dissolved in 50 ml of water and using a SUS vessel with a PTFE inner housing, the autoclave was charged with the above initiator solution to start the polymerization reaction. As the internal pressure dropped with the progress of polymerization, a TFE-PMVE mixture gas of TFE:PMVE=60:40 (mol:mol) was fed at the point of time when the pressure had dropped to 0.35 MPa·G to reinstate the internal pressure to 0.4 MPa·G. This procedure was repeated. Every 3 hours after the start of polymerization, the same amount of potassium persulfate [KPS] solution as the initial charge and 26.3 g of 2N-KOH were fed to the autoclave to continue the polymerization. This procedure was repeated and, after 11 hours, the autoclave was cooled and the monomer gas was exhausted to recover 2180 g of an emulsion. The pH of the emulsion was 3.10.

The emulsion obtained was then coagulated, separated, washed, and dried in the same manner as in Example 4 to recover 346 g of a fluorocopolymer which was syrupy at room temperature. This fluorocopolymer was one having a carboxyl group at its trunk chain end. The monomer ratio (by mol) of this fluorocopolymer as determined by $^{19}$F-NMR spectrometry was TFE:PMVE=59.2:40.8, the number average molecular weight of the copolymer as determined by IR analysis was 16000 [ε: 525 (L·cm$^{-1}$·mol$^{-1}$)], and the Mooney viscosity of the copolymer at 50° C. was 78.

IR spectrum: 1774 cm$^{-1}$ (C=O)

EXAMPLE 8

Except that a SUS vessel with a PTFE inner housing was used for charging the autoclave with the initiator, the polymerization was carried out in otherwise the same manner as in Example 5.

The emulsion obtained by said polymerization contained a small amount of precipitated polymer. The emulsion with precipitated polymer was dripped into 5 volumes of 7 mass % hydrochloric acid for complete coagulation. The polymer layer was separated and dried in vacuo at 120° C. for 70 hours to recover 252.4 g of a fluorocopolymer which was syrupy at room temperature. The fluorocopolymer thus obtained was dissolved in 10 volumes of Fluorinert FC-77 [™, product of Sumitomo 3M Limited; a solvent composed predominantly of perfluoro(2-n-butyltetrahydrofuran)], whereupon the polymer became partially insoluble and settled. After the insoluble matter was removed, the solution was washed with 7 mass % hydrochloric acid. From the washed solution, the solvent was removed to recover 231.9 g of a fluorocopolymer which was syrupy at room temperature. IR analysis revealed that the fluorocopolymer obtained was a polymer having a carboxyl group at its trunk chain end. This fluorocopolymer was found to have a monomer ratio (by mol) of TFE:PMVE=57.2:42.8 gas determined by $^{19}$F-NMR spectrometry, a number average molecular weight of 7300 as determined by IR analysis [ε: 525 (L·cm$^{-1}$·mol$^{-1}$)], and a Mooney viscosity of 19 at 50° C.

IR spectrum: 1774 cm$^{-1}$ (C=O)

The above insoluble matter was washed with 7 mass % hydrochloric acid and dried in vacuo at 120° C. for 48 hours to remove the contaminant solvent, whereupon 15.3 g of a fluorocopolymer which was syrupy at room temperature was obtained. The fluorocopolymer obtained had carboxyl groups at chain ends and the number average molecular weight of the copolymer as determined by IR analysis and calculation was 3700 [ε: 525 (L·cm$^{-1}$·mol$^{-1}$)].

IR spectrum: 1774 cm$^{-1}$ (C=O)

EXAMPLE 9

In a flask equipped with a reflux condenser, 160 g of the fluorocopolymer having a carboxyl group at its trunk chain end as obtained in Example 4, 160 g of methanol, and 12 g of sulfuric acid were heated at an internal temperature of 65° C. for 23 hours to reflux the methanol. The resulting fluorocopolymer was washed with methanol and dried in vacuo at 120° C. to remove the methanol.

IR analysis and $^1$H-NMR spectrometry revealed that the both ends of a trunk chain f the fluorocopolymer thus obtained had been transformed to methoxycarbonyl groups.

Figure 3:
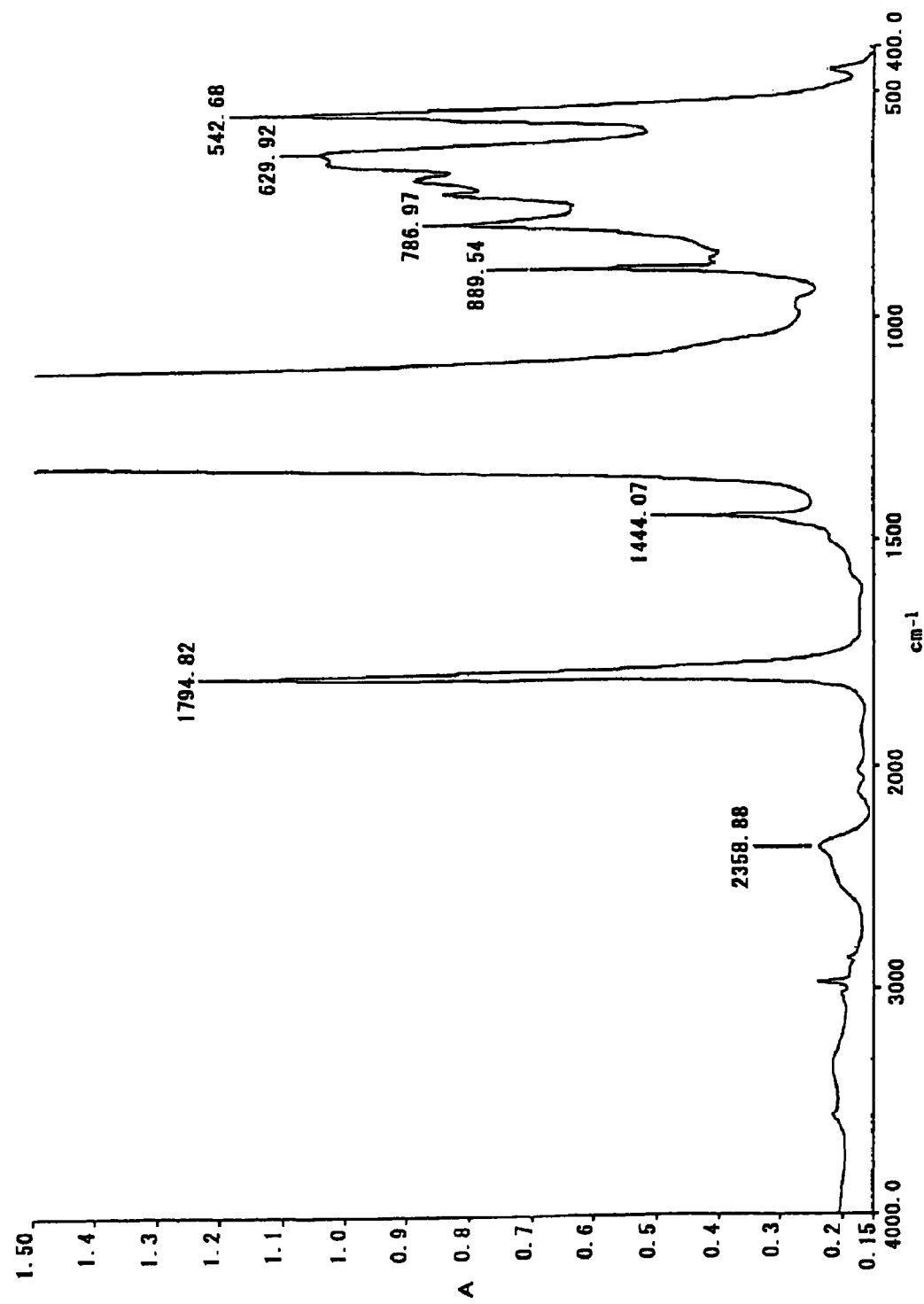
FIG. 3 is an infrared absorption spectrum obtained by the infrared spectrometric analysis in Example 9.

This fluorocopolymer had a molecular weight of 4750 as determined by $^1$H-NMR spectrometry. The viscosity of the copolymer as measured with a type E viscometer at a shear rate of 10 s$^{-1}$ and a temperature of 50° C. was 433 Pa·s. The IR chart is presented in FIG. 3.

IR spectrum: 1975 cm$^{-1}$ (C=O)

$^1$H-NMR (solvent:perfluorobenzene, TMS standard): 4.3 ppm (COOCH$_3$)

EXAMPLE 10

In a flask equipped with a reflux condenser, 160 g of the fluorocopolymer having a carboxyl group at its trunk chain end as obtained in Example 7, 160 g of methanol, and 12 g of sulfuric acid were heated at an internal pressure of 65° C. for 35 hours to reflux the methanol. The resulting fluorocopolymer was washed with methanol and dried in vacuo at 120° C. to remove the methanol.

IR analysis revealed an absorption at 1795 cm$^{-1}$, indicating that the both ends of a trunk chain of the fluorocopolymer had been transformed to methoxycarbonyl groups.

The fluorocopolymer thus obtained had a number average molecular weight of 16000 as determined by $^1$H-NMR spectrometry and a Mooney viscosity of 51 at 50° C.

IR spectrum: 1795 cm$^{-1}$ (C=O)

$^1$H-NMR (solvent:perfluorobenzene, TMS standard): 4.3 ppm (COOCH$_3$)

EXAMPLE 11

In a flask equipped with a reflux condenser, 160 g of the fluorocopolymer having a carboxyl group at its trunk chain end as obtained in Example 5, 160 g of methanol, and 12 g of sulfuric acid were heated at an internal temperature of 65° C. for 40 hours to reflux the methanol. The resulting fluorocopolymer was washed with methanol and dried to remove the methanol.

IR analysis revealed an absorption at 1795 cm$^{-1}$, indicating that the both ends of a trunk chain of the fluorocopolymer had been transformed to methoxycarbonyl groups.

The fluorocopolymer thus obtained had a number average molecular weight of 7330 as determined by $^1$H-NMR analysis.

IR spectrum: 1795 cm$^{-1}$ (C=O)

$^1$H-NMR (solvent:perfluorobenzene, TMS standard): 4.3 ppm (COOCH$_3$)

EXAMPLE 12

Figure 4:
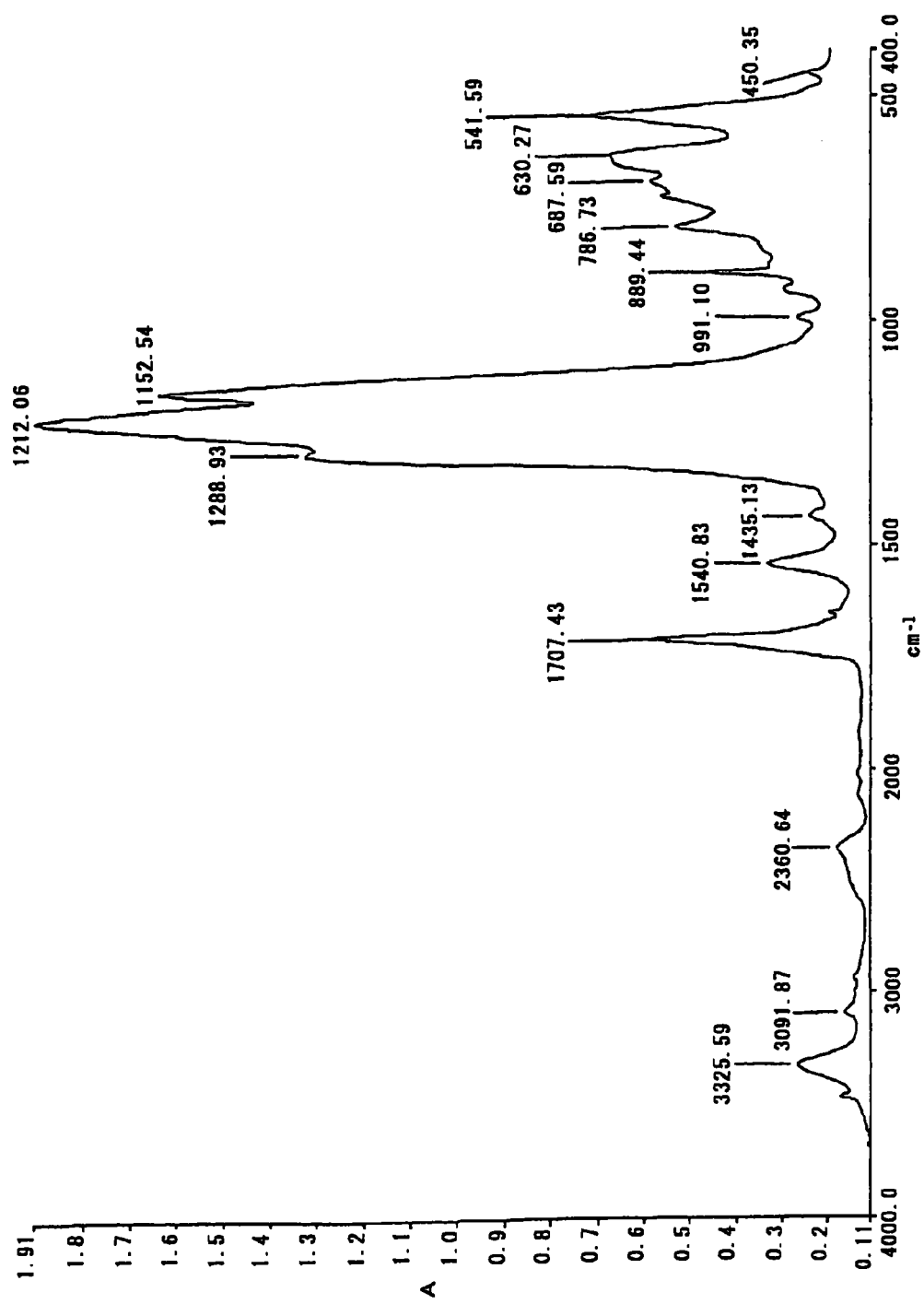
FIG. 4 is an infrared absorption spectrum obtained by the infrared spectrometric analysis in Example 12.

Two (2) grams of the fluorocopolymer having a methoxycarbonyl group at its trunk chain end as obtained in Example 11 was admixed with 0.35 g of allylamine H$_2$C=CHCH$_2$NH$_2$. Since admixing at room temperature resulted in partial evaporation of the allylamine, 0.35 g of allylamine was further added and admixed. The mixture was heated at 80° C. for 48 hours to cause the reaction to proceed and remove the excess allylamine and product methanol, whereby a tacky fluorocopolymer was obtained. IR analysis and $^1$H-NMR spectrometry revealed that the amino group of allylamine had reacted with the methoxycarbonyl group to form an amido linkage and the both ends of a trunk chain of the fluorocopolymer had been transformed to an unsaturated group. The IR chart is presented in FIG. 4.

IR spectrum: 1707 cm$^{-1}$ (C=O), 1650 cm$^{-1}$ (CH=CH$_2$)

$^1$H-NMR (solvent:perfluorobenzene, TMS standard): 6.6 ppm (1H), 6.0-6.2 ppm (1H), 5.3-5.5 ppm (2H), 4.1-4.2 ppm (2H)

EXAMPLE 13

A glass reactor equipped with a reflux condenser was charged with 2.5 g of the fluorocopolymer having a methoxycarbonyl group at its trunk chain end as obtained in Example 11 and the copolymer was heated at 120° C. under nitrogen for 2 hours. Then, 1.5 g of diallylamine (H$_2$C=CHCH$_2$)$_2$NH) was fed and reacted at 105° C. for 10 hours. The mixture was heated in vacuo at 120° C. for 60 hours to remove the excess diallylamine and product methanol, whereby a fluorocopolymer having a tacky consistency was obtained. IR analysis and $^1$H-NMR spectrometry revealed that the amino group of diallylamine had reacted with the methoxycarbonyl group to form an amido linkage and the both ends of a trunk chain of the fluorocopolymer had been transformed to an unsaturated group.

IR spectrum: 1685 cm$^{-1}$ (C=O)

$^1$H-NMR (solvent:perfluorobenzene, TMS standard): 6.0-6.4 ppm (1H), 5.7-5.9 ppm (2H), 3.9-4.0 ppm (2H)

EXAMPLE 14

To 1.41 g of the fluorocopolymer having a methoxycarbonyl group at its trunk chain end as obtained in Example 11 was added 0.117 g of the crosslinking agent 3-(diethoxymethylsilyl)propylamine (™: LS-2450, Product of Shin-Etsu Chemical Co., Ltd.), and the mixture was stirred at room temperature and sandwiched in sheet form between fluororesin films. The fluororesin film on one side was peeled off and the sheet was exposed to air at atmospheric pressure for 5 hours at room temperature to prepare a cured article (sheet). This cured article was elastic but lacking in the tackiness of the fluorocopolymer having a methoxycarbonyl group at its trunk chain end as obtained in Example 11, besides being transparent.

The resulting cured article showed no change in shape even when allowed to stand at room temperature for 7 days. After 7 days' standing at room temperature, the cured article was immersed in 97 volume % perfluoro (2-n-butyltetrahydrofuran) at 40° C. for 60 hours and the eluted fluorocopolymer was quantitated to find the gel fraction of the cured article. The gel fraction was found to be 0.994.

A cured article obtained in a sheet form by the same procedure as above was allowed to stand at room temperature for 3 days, after which it was heated at 120° C. for 15 hours and its gel fraction was determined and found to be 0.996.

Figure 5:
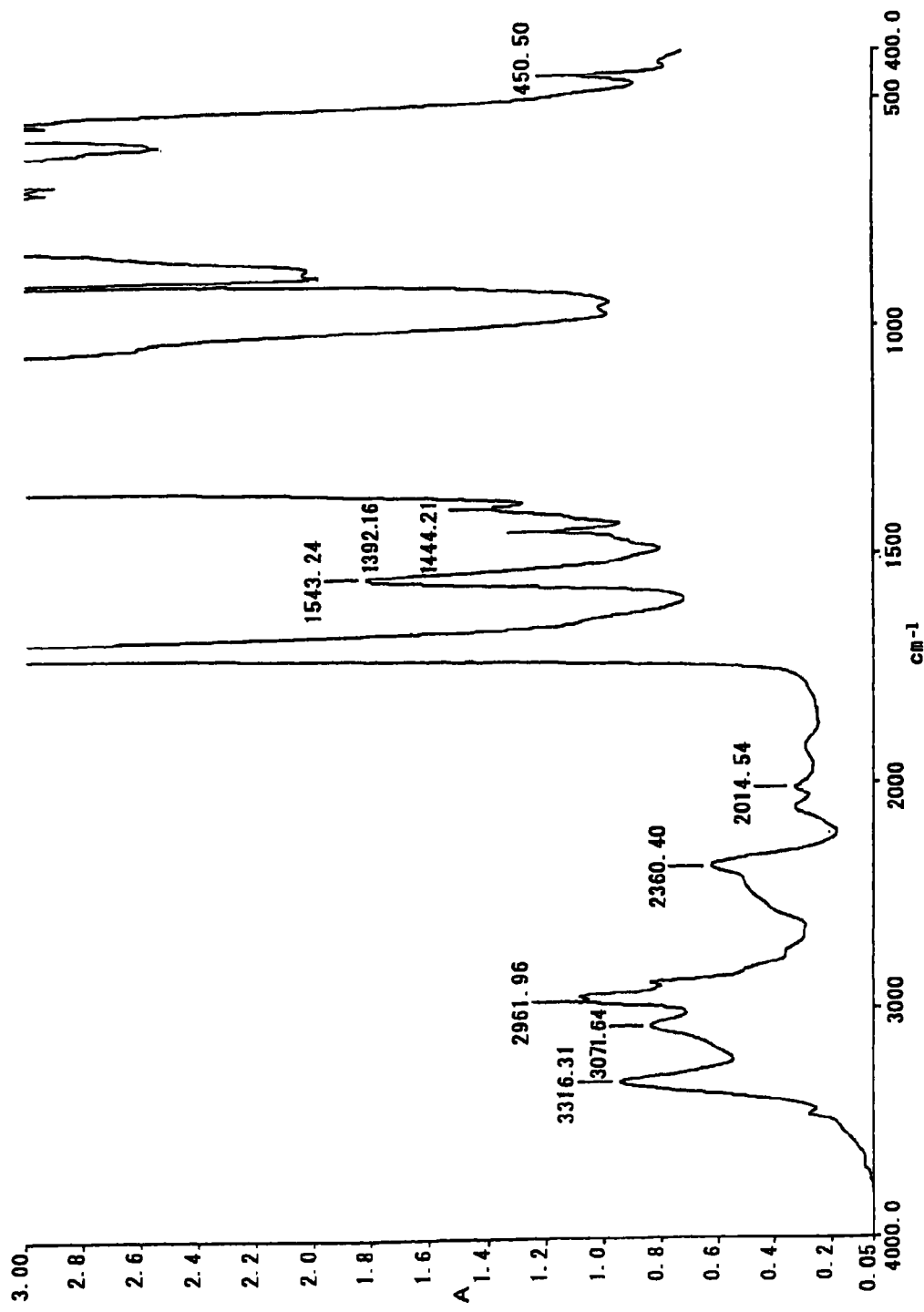
FIG. 5 is an infrared absorption spectrum obtained by the infrared spectrometric analysis in Example 14.

The glass transition point of the cured article as measured with a differential scanning calorimeter was −6° C. The IR chart of the cured article is presented in FIG. 5.

EXAMPLE 15

Except that the amount of the fluorocopolymer was changed to 1.69 g and the crosslinking agent was changed to 0.348 g of 3-aminopropyltriethoxysilane (™, A-1100, product of Nippon Unicar Company Ltd.), the procedure of Example 14 was otherwise repeated to mold the fluorocopolymer into a sheet form and the sheet was allowed to stand at room temperature under exposure to air at atmospheric pressure for 5 hours to give a cured article. The resulting cured article was elastic but lacking in the tackiness of the fluorocopolymer having a methoxycarbonyl group at its trunk chain end and had been opacified. This cured article showed no change in shape even when heated at 70° C. for 28 hours. The gel fraction was determined in the same manner as in Example 14. As a result, the fluorocopolymer was not eluted into the solvent and the gel fraction was 1.00.

EXAMPLE 16

The fluorocopolymer having an unsaturated group at its trunk chain end as obtained in Example 12, 0.213 g, was mixed with 0.012 g of the crosslinking agent triallyl isocyanurate and 0.111 g of an organic peroxide (™, Perhexa 25B, product of NOF Corporation). The organic peroxide partially remained unblended but this mixture was sandwiched between fluororesin films and heated at 160° C. for 1 hour to give a cured article. This article was elastic but had no longer the tackiness of the fluorocopolymer having an unsaturated group at its trunk chain end as obtained in Example 12.

EXAMPLE 17

The fluorocopolymer having a methoxycarbonyl group at its trunk chain end as obtained in Example 11 (1.2 g) was mixed with 0.126 g of the perfluoropolyether F $(CF_2CF_2CF_2O)_nCF_2CF_3$ having an verage molecular weight of 4500. Then, 0.099 g of the crosslinking agent 3-(diethoxymethylsilyl)propylamine (™, LS-2450, product of Shin-Etsu Chemical Co., Ltd.) was added and admixed at room temperature and the whole was sandwiched between fluororesin films and formed into a sheet. The fluororesin film on one side was peeled off and the sheet was left standing at room temperature for 1 day under exposure to air at atmospheric pressure. The resulting cured article was elastic but lacking in the tackiness of the fluorocopolymer having a methoxycarbonyl group at its trunk chain end as obtained in Example 11, besides being transparent. Bleeding of part of the blended perfluoropolyether was observed on the surface of the cured article.

The glass transition point of the cured artifact as measured with a differential scanning calorimeter was −20° C.

EXAMPLE 18

The fluorocopolymer having a methoxycarbonyl group at its trunk chain end as obtained in Example 11, 0.75 g, was blended with 0.082 g of the silicon-containing organic fluoropolymer (B) having hydrogenated ends as described in Example of Synthesis-3 in Japanese Kokai Publication Hei-09-157388 in a nitrogen atmosphere and, then, 0.062 g of the crosslinking agent 3-(diethoxymethylsilyl)propylamine (™, LS-2450, product of Shin-Etsu Chemical Co., Ltd.) was added and admixed. The mixture was sandwiched in a sheet form between fluororesin films. The fluororesin film on one side was peeled off and the sheet was left standing at room temperature for 1 day under exposure to air at atmospheric pressure to give a cured article. The resulting cured article was elastic but lacking in the tackiness of the fluorocopolymer having a methoxycarbonyl group at its trunk chain end as obtained in Example 11. Moreover, no bleeding of the silicon-containing organic fluoropolymer having hydrogenated ends was observed on the surface of the cured article.

The gel fraction of the cured article as determined by the same procedure as in Example 14 was 0.983.

The glass transition point of the cured article as measured with a differential scanning calorimeter was −12° C.

EXAMPLE 19

The fluorocopolymer having an unsaturated group at its trunk chain end as obtained in Example 12 was heated at 180° C. in the air at atmospheric pressure for 12 hours, and 0.1055 g of this fluorocopolymer subjected to the above heat treatment and 0.010 g of the crosslinking agent (25-30% methylhydrosiloxane)-(dimethylsiloxane) copolymer (™, HMS-301, product of GELEST; mol. wt. 1900-2000) were dissolved in 1.0 g of hexafluorobenzene (product of Tokyo Kasei Kogyo Co., Ltd.). To this solution was added 0.0080 g of 0.06% platinum catalyst/toluene [PT-VTSC-12.OVTS (product of OMG Precious Metals Japan) diluted 200-fold with toluene], and the mixture was stirred at room temperature to prepare a solution. This solution was transferred to a glass dish and heated at 100° C. for 3 minutes to give a cured article in sheet form. This cured article was further heated at 150° C. for 5 hours, whereby the solvent hexafluorobenzene and toluene were evaporated off. The resulting cured article was elastic but lacking in the tackiness of the fluorocopolymer having an unsaturated group at its trunk chain end as obtained in Example 12, besides being transparent. The IR spectrum of the resulting cured article had no absorption at 1650 cm$^{-1}$, indicating that the unsaturated groups at the both ends of a trunk chain had reacted with the (25-30% methylhydrosiloxane)-(dimethylsiloxane) copolymer. The gel fraction of the cured article as determined by the same method as in Example 14 was 0.985.

EXAMPLE 20

The solution prepared in Example 19 was coated onto an aluminum sheet subjected to blasting of the surface and heated at 50° C. and atmospheric pressure for 5 hours to evaporate the solvent. Then, it was heated at 100° C. for 3 minutes and further at 150° C. for 3 hours to give a multiple-layer article having a fluorocopolymer coating surface layer.

EXAMPLE 21

The fluorocopolymer having a methoxycarbonyl group at its trunk chain end as obtained in Example 11, 14.1 g, was blended with 1.17 g of 3-(diethoxymethylsilyl)propylamine (™, LS-2450, product of Shin-Etsu Chemical Co., Ltd.) at room temperature in a nitrogen-purged glove compartment to prepare a fluorocopolymer curable composition.

The fluorocopolymer curable composition thus obtained was filled into the 10 ml-syringe of a dispenser system (™, Digital Controlled Dispenser ML-606GX, product of Musashi Engineering, Inc.) in the glove compartment. The syringe was heated at 50° C. and using the above dispenser system, a metallic substrate for a personal computer hard disk drive was coated with the fluorocopolymer curable composition by the dispenser coating method.

The fluorocopolymer curable composition underwent curing when left standing at room temperature for one day under exposure to air at atmospheric pressure to give a gasket comprising an integral article consisting of a metallic substrate and a superimposed seal layer of cured fluorocopolymer for hard disk drive use.

INDUSTRIAL APPLICABILITY

Because of the constitution described above, the fluorocopolymer of the present invention can be produced in the form of a curable polymer having fluidity at room temperature providing for good processability and enabling on-site molding by an inexpensive production technology.

The invention claimed is:
1. A fluorocopolymer curable composition comprising a fluorocopolymer, a compound having 2 or more Si—H groups within each molecule, a hydrosilylation reaction catalyst,
   said fluorocopolymer being fluid at room temperature and curable,
   being obtained from a monomer substantially consisting of a trifluorovinyl group-containing monomer, having a number average molecular weight of 500 to 20000, and having an unsaturated group at both ends of a trunk chain, the trifluorovinyl group-containing monomer being a fluorovinylether of the following general formula (I):

$$CF_2\!=\!CF\!-\!O\!-\!R^1 \quad (I)$$

(wherein $R^1$ represents an alkyl group of 1 to 20 carbon atoms optionally having 4 or less of oxygen atoms and optionally substituted by a fluorine atom), and/or being a trifluorovinyl group-containing linear compound represented by the following general formula (IV) [provided, however, that said fluorovinylether of general formula (I) is excluded]:

$$CF_2\!=\!CF\!-\!(O\!-\!R_f^2)_n\!-\!Y^2 \quad (IV)$$

(wherein $Y^2$ represents an alkyl group of 1 to 5 carbon atoms optionally substituted by fluorine, an alkoxy group of 1 to 5 carbon atoms optionally substituted by fluorine, or a halogen atom; $R_f^2$ represents a straight-chain or branched-chain perfluoroalkylene group of 1 to 3 carbon atoms; n represents an integer of 0 to 5).

2. The fluorocopolymer curable composition according to claim 1, the trifluorovinyl group-containing monomer being tetrafluoroethylene and the fluorovinylether of the following general formula (I):

$$CF_2\!=\!CF\!-\!O\!-\!R^1 \quad (I)$$

(wherein $R^1$ represents an alkyl group of 1 to 20 carbon atoms optionally having 4 or less of oxygen atoms and optionally being substituted by a fluorine atom).

3. The fluorocopolymer curable composition according to claim 1, wherein the fluorocopolymer has a viscosity of 0.1 to 2000 Pa·s at room temperature as measured with a type E viscometer.

4. The fluorocopolymer curable composition according to claim 1, wherein the fluorocopolymer has a Mooney viscosity of 5 to 100 at room temperature.

* * * * *